United States Patent [19]
Culp

[11] Patent Number: 5,399,930
[45] Date of Patent: Mar. 21, 1995

[54] MAGNETIC ACTUATOR

[75] Inventor: Gordon W. Culp, Van Nuys, Calif.

[73] Assignee: Rockwell International Corporation, Seal Beach, Calif.

[21] Appl. No.: 116,922

[22] Filed: Sep. 3, 1993

Related U.S. Application Data

[63] Continuation of Ser. No. 767,970, Sep. 30, 1991, abandoned.

[51] Int. Cl.$^6$ .................. H01L 41/08; H02K 1/06
[52] U.S. Cl. ...................... 310/328; 310/12; 318/135
[58] Field of Search ............ 310/12, 46, 328, 15, 310/20, 37, 40 MM; 318/135

[56] References Cited

U.S. PATENT DOCUMENTS

| | | | |
|---|---|---|---|
| 3,154,700 | 10/1964 | McNaney | 310/323 |
| 3,555,380 | 1/1971 | Hings | 318/135 |
| 4,622,483 | 11/1986 | Stzufenberg, Jr. et al. | 310/328 |
| 4,752,711 | 6/1988 | Tsukimoto et al. | 310/328 |
| 4,928,030 | 5/1990 | Culp | 310/328 |
| 5,043,621 | 8/1991 | Culp | 310/316 |
| 5,087,852 | 2/1992 | Culp | 310/323 |
| 5,144,187 | 9/1992 | Culp | 310/328 |

OTHER PUBLICATIONS

Technical Reference EMDUSM-8703 "Ultrasonic Motor", Panasonic Industrial Co., Electric Motor Div. of Matsushita Industrial Co. Ltd., Osaka Japan.
American Institute of Physics Handbook, 3rd Ed., D. E. Gray, Ed., McGraw Hill Book Co., N.Y., pp. 5-33.
Kolin et al., "An Intra-Arterial Induction Gauge", IEEE Trans. on Bio-Medical Eng., vol. BME-18, No. 2, Mar. 1971, pp. 110-114.
Attwood, S. S., "Electric and Magnetic Fields", 2nd ed., John Wiley and Sons, N.Y., 1941, chapter 15.
"Design and Application of Permanent Magnets", Manual No. 6a, Indiana General Corp., Kitchener, Ontario, 1960.
"Helenoid Actuators," 2 brochure of Lucas Industries, N.S.F. Ltd., Ingros Works, Ingrau Lane, Keithley, Yorks BD21 SEF, c. 1980.

*Primary Examiner*—Steven L. Stephan
*Assistant Examiner*—D. R. Haszko
*Attorney, Agent, or Firm*—H. F. Hamann; Harry B. Field; Steven E. Kahm

[57] ABSTRACT

This invention is for magnetic actuators which are composed of individually controlled layers. Each layer comprises a stationary sheet 34, a movable sheet 30 and a roller 40 between the sheets. Each layer may either have ribs 32 or sheet portions having conductors, remanent portions or permeable portions which apply a magnetic force against the roller to move the sheets. The magnetic force may be between a current carrying roller and a current carrying rib or sheet portion, a current carrying roller and a remanent rib or sheet portion, a current carrying roller and a permeable rib or sheet portion, a magnetic roller and a current carrying rib or sheet portion, or a permeable roller and a current carrying rib or sheet portion. The sheets in each layer may be moved in parallel or normal directions. When the layers are stacked, actuators may be made. The actuators can be controlled in pairs or larger groups to position and move objects and motor shafts. Thus motors generators and actuators can be made. By using Fourier mechanical summing of the layers smooth walking motion of the actuators can move and position objects and drive motor shafts with minimal frictional loss of energy and without the use of bearings or lubricants.

222 Claims, 8 Drawing Sheets

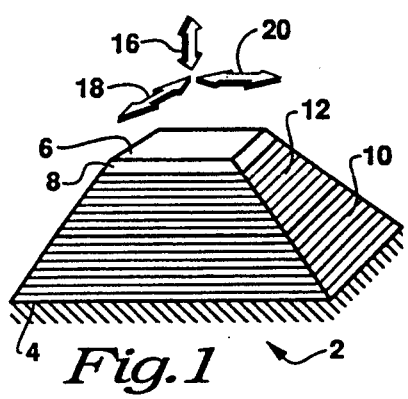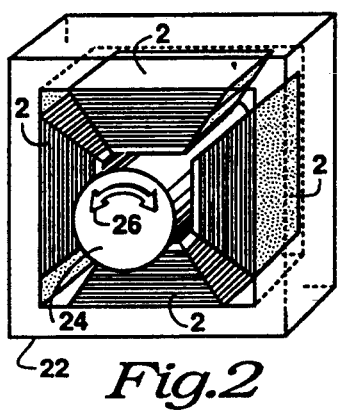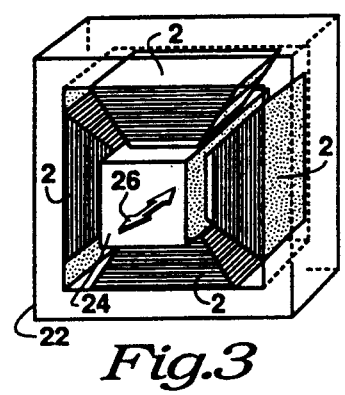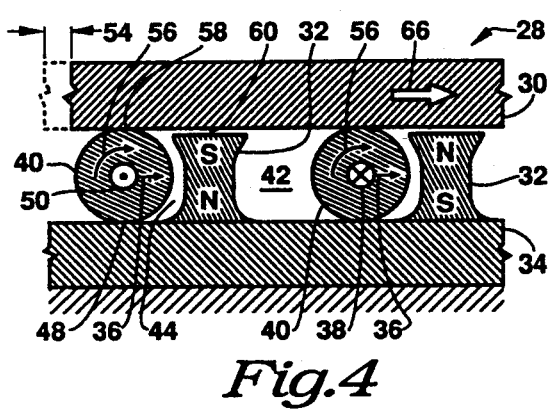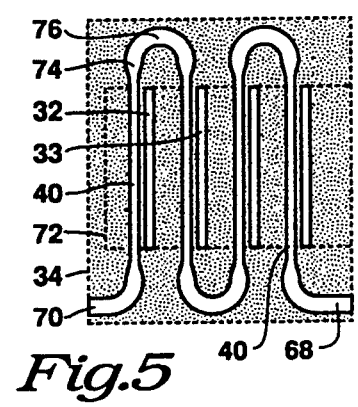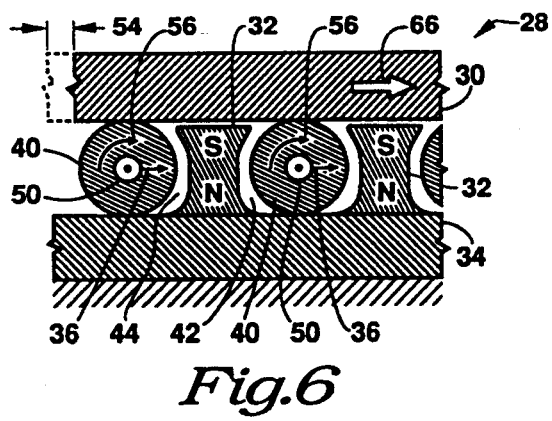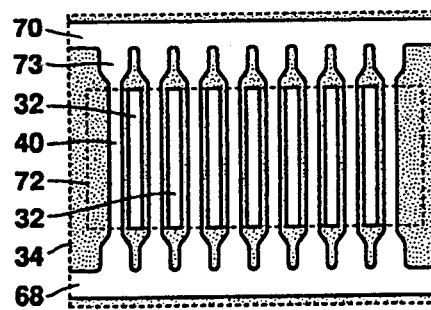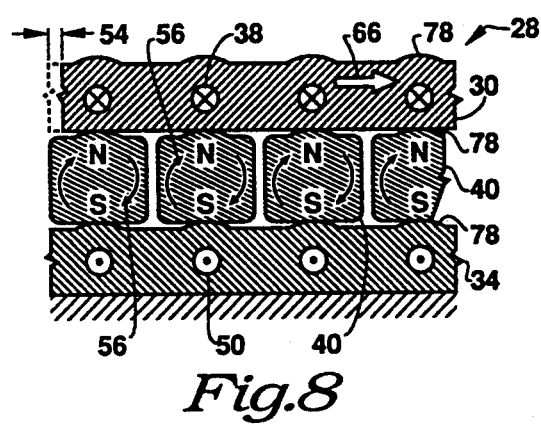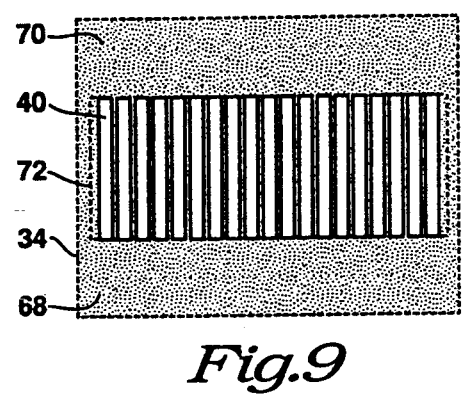

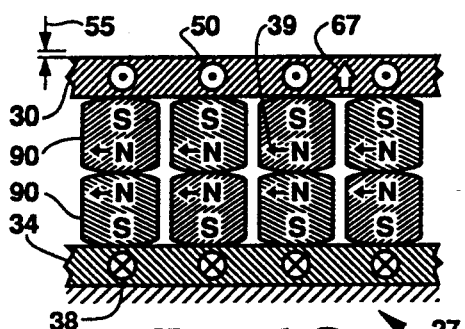
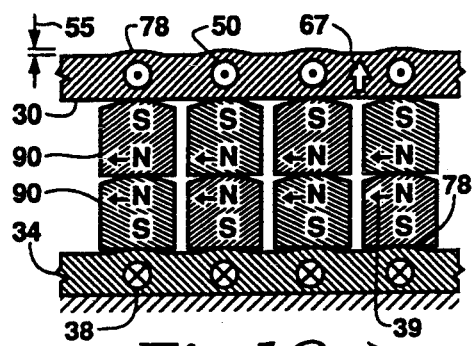
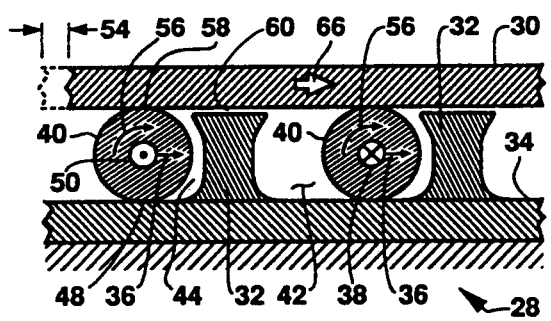
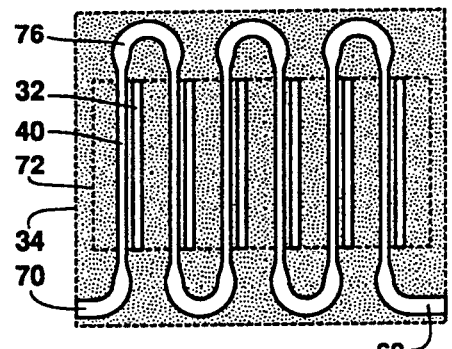
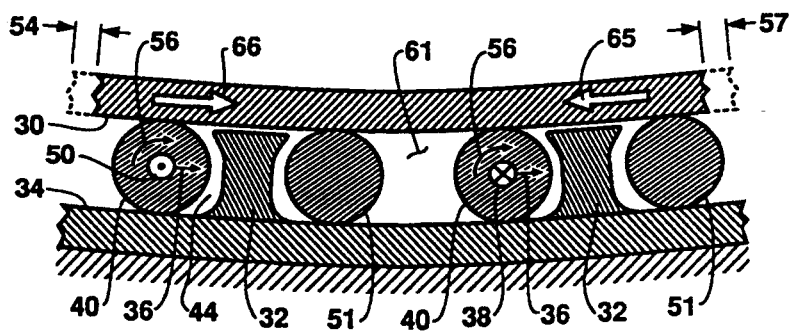
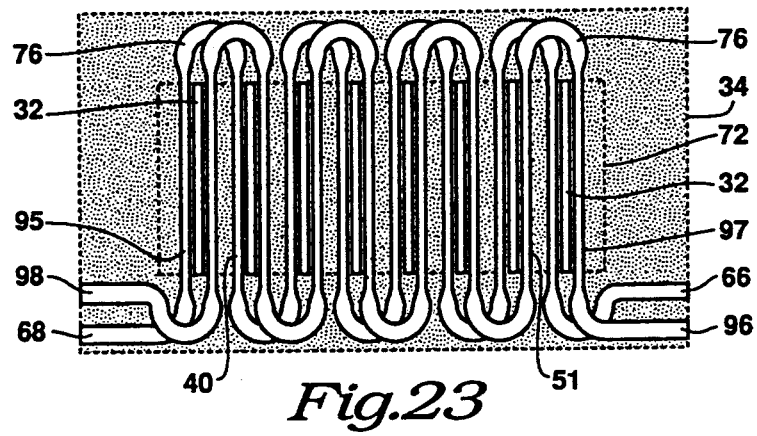

MAGNETIC ACTUATOR

This is a continuation of copending application Ser. No. 07/767,970, filed on Sep. 30, 1991, now abandoned.

BACKGROUND ART

In applicant's patent, U.S. Pat. No. 4,928,030 issued May 22, 1990, he teaches two- and three-axis piezoelectric actuators that position an object such as a rod or motor shaft by walking traction. A lifter piezoelectric actuator portion positions the actuator's traction member perpendicular to the object's surface. A tangenter piezoelectric actuator portion positions the actuator's traction member tangential to the object's surface. Lifter and tangenter portions of an actuator are integrally constructed and independently electrically controllable. Cyclical coordinated lifter and tangenter actions cause the traction member to walk the object's surface in a manner which differs from that of the ultrasonic traveling wave motors referenced infra.

Applicant's patent U.S. Pat. No. 5,043,621 issued Aug. 27, 1991 discloses a walking cycle which consists of activating the lifter to apply a predetermined normal force between the traction member and the object while the tangenter translates the traction member at a speed equal to the surface speed of the object. During application and removal of normal force, no mechanical work is done by the traction member on the object. As the normal force is applied, a tangential strain corresponding to a tangential force on the positioned object is added by the tangenter portion. The product of the tangential force and the tangential distance traveled during the power portion of the stroke is the work done on the object. The work done per unit time, averaged over a complete cycle, is the power transmitted to the object.

At the end of the power portion of the cycle the tangential strain is removed as the normal force is removed by the lifter, still maintaining zero relative speed between object and traction member. As the traction member leaves the object's surface, the traction member retraces, that is, it reverses tangential stroke direction and changes speed until the opposite extreme tangential position is reached, thereby preparing for a new walking stride. This is a smooth walking cycle because sliding is avoided.

When actuators execute walking cycles in pairs, one actuator performs a power stroke while the other retraces. A predetermined coordinated positioning of the traction members of both actuators results in bipedal smooth walking. Smooth walking is defined in U.S. Pat. No. 4,928,030 as uninterrupted and smooth tractional power transmission without sliding.

The piezoelectric materials of U.S. Pat. No. 4,928,030 are generally electrically polarized ferroelectric ceramics. This class of materials is relatively brittle, having relatively little tensile strength. In addition, the temperature above the usual room temperature at which electrical polarization is irreversibly lost, usually called the Curie temperature, is relatively low. These physical properties are a detriment in some applications of walking actuators. U.S. Pat. No. 4,928,030 also teaches the use of relatively high applied voltages to achieve desirably large mechanical strokes. High voltages are a disadvantage in the context of solid state electronic drive devices, such devices having evinced more efficient operation with low voltages with relatively large currents.

Applicant's copending application Ser. No. 07/743,069 filed Aug. 9, 1991 which is a continuation of Ser. No. 07/488,548 filed Mar. 5, 1990 titled Electric Drive for a Segmented Transducer teaches the use of multiresonant generation of nonsinusoidal mechanical stroke wave forms needed for smooth walking. The teachings are primarily directed toward piezoelectric actuators, but are also directed toward electromagnetic actuators that function in a manner similar to piezoelectric ones. The benefits taught are relatively high electrical efficiency derived from resonant excitation of actuator portions, and relatively high electrical stability not normally associated with power amplifiers that drive preponderantly reactive electrical loads. Included in the teachings are the advantages of reactive electrical power sharing between inductive and capacitive portions of the same actuator, resulting in internal reactive electrical power circulation rather than relying on ancillary electrical components.

Many, many background embodiments of resonant traction motors, also referred to as ultrasonic traveling wave motors, are known, for example, Technical Reference EMDUSM-8703 "Ultrasonic Motor", Panasonic Industrial Co., Electric Motor Division of Matsushita Industrial Co. Ltd. Osaka Japan.

This class of motors uses piezoelectric deformations to cyclically sinusoidally excite resonance in an elastic mechanical oscillator such as a ring. One or more surface portions of the oscillator are thereby positioned in an elliptical or circular path. The surface portions cyclically contact the surface of a positioned object or rotor and impart motion thereto by traction. Smooth walking is not achieved by this class of motor because the tangential component of the speeds of the oscillator traction surface portions match the speed of the rotor at at most two relatively small segments of each cycle. Elsewhere in the cycle the mismatch in speed causes traction surface rubbing. Sixty per cent of the available power is transduced to heat due to rubbing in a typical ultrasonic traveling wave motor. Mechanical elastic resonance is predominantly sinusoidal. Relatively high mechanical efficiency is therefore not expected from mechanical resonance traction.

The resonance taught in the applicant's application Ser. No. 07/743,069 filed Sep. 9, 1991 which is a continuation of Ser. No. 07/488,548 filed Mar. 5, 1990 is electrical. The stroke portion contributed by each actuator portion is sinusoidal, is electrically resonant, but not necessarily mechanically resonant. The excitation frequency and amplitude of each actuator portion are predetermined by Fourier rules such that the wave form of the mechanical stroke as measured at the traction member is the algebraic sum of the stroke contributions. This contrasts with the traditional Fourier summing that is done electrically to produce a predetermined and desired electrical wave form that is not sinusoidal. The Electric Drive for a Segmented Transducer application teaches the mechanical wave forms needed to produce smooth walking. Smooth walking results in relatively high mechanical efficiency. Relatively high mechanical efficiency of smooth walking, in combination with the relatively high electrical efficiency of Fourier drive, provides a relatively high actuator system efficiency.

In applicant's copending application Ser. No. 07/697,368 filed May 9, 1991 lifter and tangenter layers are taught using similar rollers but having heat pulses instead of magnetic force as the motivating force.

American Institute of Physics Handbook, 3rd Ed., D. E. Gray, Ed., McGraw Hill Book Co., New York, page 5-33 describes the magnitude and direction of forces mutually acting on two proximate electrical conductors carrying currents. The force F in newtons on one conductor is given as $$F = 2 I_1 I_2 a^{-1} \times 10^{-7}$$

where $I_1$ and $I_2$ are currents in amperes, and a is the distance between conductors in meters.

Culp, G. and Kolin, A., An Intra-Arterial Induction Gauge, IEEE Trans. on Bio-Medical Eng., vol. BME-18, No. 2, March 1971, pp 110–114 describes a relatively accurate method of measuring position by measuring the voltage in a second conductor loop induced by an alternating signal in a first loop, the induced voltage being proportional to the area of both loops.

Attwood, S. S., Electric and Magnetic Fields, 2nd ed., John Wiley and Sons, New York, 1941, Chap. 15 teaches methods of mapping magnetic fields generated by electric conductors proximate magnetically permeable portions, particularly the method of images wherewith the force between the conductor and the magnetically permeable portions is determined in part by assuming that a virtual conductor lies opposite the magnetically permeable portion boundary by the same distance that separates the real conductor from the boundary. Therefore, the function of the magnetically permeable portion may be assumed to be a means of calculating the force due to two currents when only one current is real. Attwood also teaches an increase of magnetic force due to the concentration of magnetic flux by magnetically permeable portions. The relations taught are easily extended to include those cases in which permeable portions are remanent.

"Design and Application of Permanent Magnets," manual no. 6a, Indiana General Corp., Kitchener, Ontario, 1960 teaches the design and application of permanent magnets, including the relationship between force, flux, and air gap reluctance. Therein is made clear the benefit of short mechanical strokes when relatively large forces are desirable, shorter strokes allowing the use of magnetic paths consisting of relatively lower reluctances that allow the generation of relatively large forces. Short mechanical strokes, in the context of the present invention, are those due to small oscillations about a quiescent physical state, as opposed to gross motions such as sliding and full rotations commonly associated with gross motion mechanisms.

"Helenoid Actuators," a brochure of Lucas Industries, N. S. F. Ltd., Ingros Works, Ingrow Lane, Keithley, Yorks BD21 5EF, c. 1980 teaches a relatively wide magnetic circuit having a relatively small cross section area of flux path, stationary conductors, a stationary pole face, and a proximate movable pole face, pole motion being facilitated by ancillary sliding bearings. Conductors participate electrically but are not mechanical agents in forcible positioning.

OBJECTS OF THE INVENTION

The object of the present invention is to make magnetic actuators driven by electric currents. Among the designs for these actuators are the remanent actuator, the current actuator, the permeable actuator, and the hybrid actuator.

The remanent actuator relies on current forces reacting with polarized "permanent" magnetic forces to position an object in one or more directions by traction, such positioning being limited only by the extent of the object's traction surface and not by the mechanical stroke length of an actuator.

The current actuator relies on the interaction of magnetic forces due to proximate pairs of currents to position an object in one or more directions with relatively high mechanical and electrical efficiency.

The permeable actuator relies on essentially non-remanent magnetic forces to position an object in one or more directions by traction, such positioning being limited only by the extent of the object's traction surface and not by the mechanical stroke length of an actuator.

The hybrid piezoelectric and electromagnetic actuator, forcefully and precisely positions an object by cyclical coordinated traction.

Other objects are:

to provide an advantageous electromagnetic substitute for piezoelectric, ferroelectric, and other electrodeformable actuator materials;

to impart relatively large forces at moderate speeds to a positioned object;

to independently electrically control force and speed of positioning;

to forcefully position an object without bearings or springs, with relatively great precision, and with relatively few life-shortening mechanisms;

to forcefully position an object in a rotary direction, in rotary directions about two axes, in a linear direction, in two angularly disposed linear directions, in rotary directions about three axes, and in combinations of linear and rotary directions by simultaneous independent electrical activation of multiple angularly disposed actuator action directions;

to forcefully position an object in a vacuum without lubricants, without lubricant seals, and without contaminating the vacuum;

to operate in space and a diverse class of chemically and radiationally deleterious environments;

to forcefully position an object using moderate voltages;

to forcefully position an object using relatively high internal energy density obtained through the use of superconductors;

to position an object with structural rigidity comparable to a solid apparatus;

to operate as a generator to convert mechanical power into electrical energy;

to position an object in a micro- and in a zero-gee environment using normal tractive forces supplied by the actuators without external normal forcing means;

to provide an actuator manufacturing method resulting in relatively high positioning energy density through microminiaturization of actuator components;

to provide an actuator having no ohmic contacts;

to scale actuator size from relatively small to very large in accordance with a large class of prime mover applications;

to operate at relatively high energy density using forced fluid convection cooling in interconductor interstices;

to operate at relatively high energy density using forced fluid convection cooling through channels internal to actuator components, also allowing vacuum and space operation without exposure or loss of coolant;

to operate in intense ionizing radiation with relatively long life and little nuclear transmutation;

to be constructed with relatively light weight;

to operate with relatively high electrical efficiency by means of magnetic flux concentrated by permeable portions;

to operate with relatively high electrical efficiency by means of magnetic flux interacting with remanent magnetic portions;

to operate with high electrical efficiency in combination with Fourier stimulation;

to operate with relatively high mechanical efficiency by means of smooth walking; and to operate with relatively high system efficiency by smooth walking combined with Fourier stimulation.

BRIEF DESCRIPTION OF FIGURES

FIG. 1. A perspective drawing of a magnetic actuator having a layered body and a traction member.

FIG. 2. A perspective partially ghosted view of a rotary motor application of the present actuator.

FIG. 3. A perspective partially ghosted view of a linear actuator application of the present actuator.

FIG. 4. A cross section view of a portion of one layer of the present actuator that supplies forceful tangential motion in one direction.

FIG. 5. A simplified plan view of a layer of the present actuator showing a series segment conductor arrangement of FIG. 4.

FIG. 6. A cross section portion view of a bidirectional tangential actuator layer.

FIG. 7. A plan view of the apparatus of FIG. 6 showing conductor segments electrically connected in parallel.

FIG. 8. A cross section view of a current sheet embodiment of a bidirectional forceful positioning actuator layer portion having components more easily fabricable by epitaxy.

FIG. 9. A plan view of rollers of the apparatus of FIG. 8.

FIG. 18. A cross section actuator view of a normal-acting layer having current sheets.

FIG. 19. A cross section view of the apparatus of FIG. 18 suited to epitaxial fabrication.

FIG. 20. A cross section view of a portion of one layer of the present actuator that supplies tangential motion and force in one direction.

FIG. 21. A simplified plan view of a layer of the present actuator showing a conductor arrangement of FIG. 20.

FIG. 22. A cross section of an actuator portion having two circuits and supplying bidirectional forceful positioning.

FIG. 23. A simplified plan view of the apparatus of FIG. 22.

DETAILED DESCRIPTION OF THE PREFERRED EMBODIMENT

Figure 10:
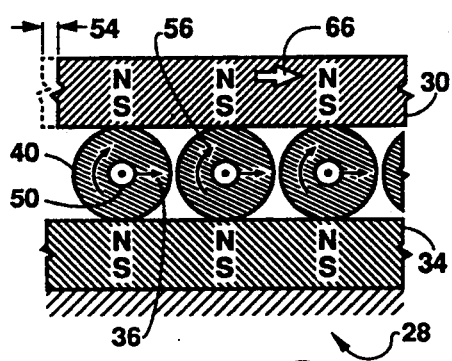
FIG. 10. A cross section view of a bidirectional tangential forceful positioning actuator layer portion having remanent sheets and dense rollers.

FIGS. 1 through 3 generally illustrate magnetic walking actuators having electrodeformable bodies. The actuators have a layer structure demarcated by parallel lines. Referring to FIG. 1, shown is a perspective view of a two-axis actuator generally indicated 2, comprising a mounting base surface portion 4, a traction surface portion 6 of traction member 8, and layered electrodeformable body portions 10 and 12. The layers, acting collectively, cause movement in a predetermined direction in proportion to a predetermined magnitude and direction of applied electric current. Actuator bodies are constructed in layers, each layer having a multiplicity of electromagnetic forcing elements. Layer separations are indicated (in FIGS. 1, 2, and 3) by lines. Body portion 10 causes positioning of traction member 8 in direction 16 and is hereinafter referred to as a lifter. Body portion 12 positions traction member 8 in direction 18 and is hereinafter referred to as a tangenter. A third body portion (see FIG. 49) similar to portion 12 but having its action direction rotated through an angle is incorporated to position the traction member in a third direction 20, thus constituting a three-axis actuator. Traction member positioning directions 16, 18, and 20 may be orthogonal, and alternatively may act along predetermined relative angular directions. Variants of a body portion position an object along a curved path such as a circular arc segment.

FIG. 2 shows a transparently illustrated rotary motor application of the present invention comprising shaft 24 and two pairs of 2-axis actuators 2, such as those shown in FIG. 1, affixed to housing 22 by their respective mounting bases (4, FIG. 1). Application of predetermined electrical signals to the actuators 2 cause shaft 24 to rotate in directions 26. An alternative embodiment of FIG. 2 uses three-axis actuators, the third axis constituting a tangenter body portion that acts in a direction parallel to the shaft axis, said portion also being referred to as an axier. Actuator pairs alternately and cyclically position and retrace on the shaft surface in a walking motion.

Coordinated activation of lifters, tangenters and axiers cause the shaft to rotate about its axis and to translate parallel to its axis, each forceful motion being independently electrically controllable. Normal force of traction is preferably supplied solely by lifters. Tangenters of example embodiment FIG. 2 position flat faced traction members 8 along straight paths, rotating round object or shaft 24 analogous to rolling a pencil between palms of the hand, but in the illustrated example, between two pairs of palms. Traction results from normal force of member 8 acting through a rolling line contact. Variants of the tangenter having curved sheets position traction member 8 along a curved path. The benefit of movement of member 8 along a curved path complementary to a curved surface of a positioned object is to distribute normal force evenly over the entire traction surface, thereby minimizing the pressure of contact. In contrast to the rolling line contact, pressure, and therefore the normal force at which the onset of contact fatigue occurs, are substantially reduced.

FIG. 3 shows a linear actuator variant of FIG. 2 comprising two-axis actuators 2 affixed to housing 22 and positioning shaft 24 in directions 26 in response to predetermined electrical stimuli applied to actuator lifters and axiers. All layers in this particular embodiment are planar.

The first embodiment of the invention is directed toward magnetic actuators with relatively high electrical and mechanical efficiency, relying on electric currents in combination with magnetically remanent materials such as permanent magnets.

FIG. 4 shows a cross section portion view of one tangenter body layer 28 comprising stationary sheet 34, movable sheet 30, rolling element 40 hereinafter referred to as roller, a roller in this embodiment comprising rolling electrical conductors, and fixed elements which in this embodiment are magnetically remanent members such as permanent magnets in strip form, hereinafter referred to as ribs 32 affixed to sheet 34. The sheets in this embodiment may be paramagnetic. Gap 60 between rib 32 and sheet 30 prevents rubbing during forceful positioning. The layer portion is depicted at the instant of application of an electrical current to roller 40 before motion occurs. Instantaneous directions of the applied current flow are symbolized by 50 toward the reader and 38 away from the reader. Current direction changes may be due to the snaking of the rolling conductor between the fixed elements as shown in FIG. 5. Ribs 32 alternate in pole orientation. Current 50 produces a magnetic field circulating counterclockwise about the conductor current centroid. The conductor field reacts with the field of the nearest rib, creating force 36 on conductive rollers 40 that produces moments 56. Conductor force in combination with rolling traction at line contacts 48, 58 moves translatable sheet 30 in direction 66 by mechanical stroke 54. The cumulative force-stroke product per unit time is the mechanical power supplied to the positioned object.

The forces and motions may be considered the result of motional reduction of magnetic flux path reluctance in gaps 44 between the rollers and the remanent ribs. During motion, rollers 40 rotate and translate relative to stationary sheet 34, thereby reducing gaps 44. The reluctance is defined as resistance to the passage of magnetic flux, analogous to electrical circuit resistance. The force generated is inversely proportional to whole path reluctance. Similarly, since the current 38 of the returning roller, and the pole positions of the next rib are reversed, the resulting force 36, produces moment 56, sheet translation 66 and stroke 54, all in the same sense as the actions of current 50. Quantitatively, a forceful stroke in direction 66 is the sum of the forceful stroke contributions of all activated conductors of the actuator layer.

The conductors may be wires which rotate a fraction of a degree when current is applied. The gap between the roller and the magnet is on the order of microns (micrometers) so each layer provides a small displacement of the total movement in a stack of layers comprising an actuator body. For example, a wire of 100 microns radius rolls 10 microns (at the wire centerline) while rotating 0.1 radian (5.7 degrees), causing the sheet to move 20 microns.

The force may be deduced by the method of images, as explained in Attwood, S. S., Electric and Magnetic Fields, 2nd ed., John Wiley and Sons, New York, 1941, Chap. 15, wherein the fixed element, magnet 62, may be replaced by a virtual electrical conductor carrying current in the same direction as conductor 40, located parallel thereto, located the same distance from gap 44, and having allowances made for the remanence of the magnet. Dynamic models of the apparatus include corrections for the changes in relative component positions during stroking. Magnets provide a greater actuator force than attainable with permeable materials or currents alone.

Gap 42 is a much larger gap than gap 44, providing separation between ribs and rollers to reduce magnetic counterforces due to the clockwise magnetic field around current 38. When the directions of currents 38 and 50 are reversed from those shown, forceful positioning is antiparallel to direction 66, providing bidirectional action with bidirectional applied current. However, gap reluctance 44 increases with sheet positioning toward the left of the figure, thereby reducing the force in proportion to stroke length.

A plurality of conductors and magnet pairs fill the area of an actuator layer. Actuator walking action requires repeated relatively short strokes. A large stack of layers mechanically adds the contributions of layers to a desired and predetermined mechanical sum stroke. The short strokes allow relatively small working magnetic gaps 44. In practice, strokes are short enough to allow the approximation of constant average working gap reluctance. Electromechanical efficiency increases inversely proportional to the magnetic path length.

Known electromechanical devices such as electric motors use continuous motion with relatively long average magnetic paths. Long paths generally increase the bulk of the components of the magnetic circuit needed to achieve a particular power. The frequency with which a circuit may be electrically cycled decreases with the bulk of the circuit. Myriad compact magnetic circuits may be cycled relatively rapidly.

FIG. 5 shows a simplified plan view of the apparatus of FIG. 4, comprising rolling elements, here conductive rollers 40, fixed elements, here remanent ribs 32, stationary sheet 34 (movable sheet 30 omitted for clarity), raised sheet surface portion 72, roller current return paths 76, and electrical connections 68, 70. Both sheets 30 and 34 have the raised portion as traction contact surface for rollers and to provide additional space between sheets for roller ends. Return paths 76, hereinafter referred to as returns, are flattened to provide space for the returns of other conductors, and are representative of many embodiments of the present invention.

Return transition portions 74 are stepwise or progressively flattened to provide space for the returns of other conductors and have shapes predetermined to allow rolling of rollers, while limiting torsional and bending stresses therein to values lower than those that induce long-term fatigue. Embodiments using multiple conductor sets, each set having a series electrical connection such as those shown in FIG. 23 in place of the single conductor illustrated, increase energy density by allowing greater set sum current without increasing layer thickness.

The illustrations of FIGS. 4, 5, as well as the other cross section and plan view figures exaggerate the size and spacing of components for clarity. In practice, layer components are relatively small and densely packed to achieve relatively high electromechanical efficiency. The length of rollers such as conductor 40 are also illustrated shorter than would occur in practice. Conductor return paths 76 do not contribute to the sum of forces. Therefore, a return electrical length that is small relative to roller length reduces the fraction of available electrical power that is dissipated but does not contribute to desired transduction.

The rollers of FIG. 5 are electrically series connected, satisfying a diverse class of applications using electric drive means having a relatively high electrical impedance. In general, transduction power efficiency is greatest when the impedances of drive means and actuator body portions have the same value.

An alternate embodiment of the apparatus of FIG. 4 has partially magnetically permeable sheets. Partially permeable sheets partially complete the magnetic circuit between sheets and each pair of adjacent remanent ribs. Since ribs have alternating pole arrangements across the sheet, each layer is compressed by magnetic attraction to provide normal force necessary for rolling tractions of rolling line contacts 48, 58 (FIG. 4). Partially permeable sheets divert a portion of each rib's field, thereby reducing the force per unit current applied to each roller. A predetermined combination of sheet permeability and roller force satisfies the requirements of each particular application. Embodiments having paramagnetic sheets derive layer tractive normal force by dint of the attraction of ribs of one layer to the ribs of neighboring layers when interlayer unlike magnetic poles are most proximate.

FIG. 6 illustrates a tangenter layer portion 28 comprising stationary sheet 34, movable sheet 30, conductive rollers 40, and remanent ribs 32. At the instant of electrical current application to rollers 40, and before forceful positioning has occurred, currents 50 flow toward the reader. Currents 50 generate forces 36 in rollers 40 that cause moments 56. The sum of moment contributions 56 of the layer forcefully positions movable sheet 30 in direction 66 by mechanical stroke 54. When like poles are most proximate between layers, sheets are forced apart, requiring external normal force means.

Forceful positioning occurs as rollers 40 rotate and translate in direction 66, thus reducing the magnetic reluctances of gaps 44 but increasing the magnetic reluctances of gaps 42. Each conductor responds to force 36 that is the sum of forces engendered by the presence of the ribs 32 proximate rollers 40. Magnetic theory has each conductor responding to the vector sum of the fields of every magnetic field of the actuator, but the force components due to non-adjacent components, being reduced in magnitude by greater distance, are disregarded in the interest of clearer discourse. The force of this embodiment is therefore substantially greater due to two magnets, remanent ribs proximate each rolling conductor, than that developed by each conductor of the actuator of FIG. 4. As previously described, reversing current direction reverses forceful positioning direction.

FIG. 7 shows a simplified plan view of the actuator layer of FIG. 6, comprising stationary sheet 34 (movable sheet 30 omitted for clarity), raised sheet portion 72, conductive rollers 40, remanent ribs 32, and electrical connections 68, 70.

FIG. 8 shows an embodiment of an actuator tangenter layer 28 comprising stationary sheet 34, movable sheet 30, and rollers, here permanent magnet rollers 40. Sheets embody the fixed elements, here conductors with currents 38 and 50. Currents of a layer in opposite directions create a sum magnetic field running between and parallel to the broad sheet surfaces and perpendicular to the long dimensions of magnetic rollers 40. Interaction of the current field with the fields of rollers 40 creates moments 56 that collectively result in forceful positioning of movable sheet 30 in direction 66 by mechanical stroke 54. Reversing the direction of all currents causes forceful positioning in the direction opposite that shown in the figure, providing bidirectional action responsive to bidirectional applied current.

While round magnetic rollers (not illustrated) are used for a particular class of applications, the preferred geometry to facilitate some preferred fabrication methods has humps 78 only on the upper portions of sheets 30 and 34 and on the upper portions of rollers 40. Humps 78 on sheet surfaces have a shape predetermined to allow the rollers to roll in a manner similar to that of round rollers. The magnetic roller shape illustrated has a greater quantity of remanent material than that of a circular roller that fits the same space. The strength of the illustrated magnetic roller is increased approximately in proportion to its area increase.

Variants of the components of FIG. 8 have paramagnetic sheets, and alternatively have semipermeable sheets. The latter contribute to or completely provide layer compression necessary for the previously explained roller traction.

FIG. 9 shows a plan view of the layer of FIG. 8, including stationary sheet 34 (movable sheet 30 omitted for clarity), raised sheet portion 72, magnetic rollers 40, current inlet connection 68 and current outlet connection 70. Thickened edge portions (not depicted) of each current sheet more uniformly distribute current density while lowering electrical resistance.

FIG. 10 is a section portion view of a tangenter layer 28 comprising stationary permanent magnet sheet 34, movable permanent magnet sheet 30, and conductive rollers 40. Each current 50 toward the reader circulates a counterclockwise magnetic field that interacts with the magnet sheet field to cause forces 36 and moments 56. The sum of moments 56 of the layer forcefully positions movable sheet 30 in direction 66 by mechanical stroke 54.

Figure 11:
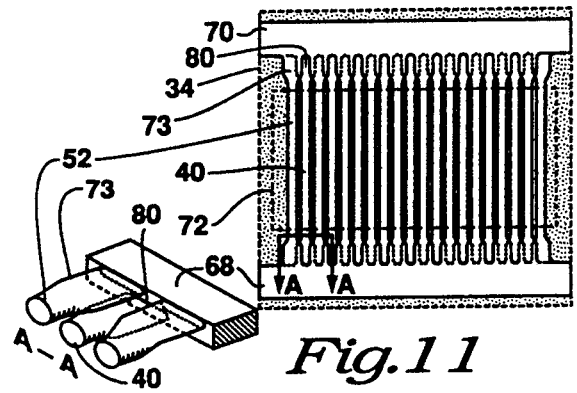
FIG. 11. The plan view with perspective detail of the apparatus of FIG. 10.

FIG. 11 is a plan view of the layer of FIG. 10 showing stationary magnet sheet 34 (movable sheet 30 omitted for clarity), raised sheet portion 72, conductive rollers 40, flattened torsionally compliant returns 73, current inlet 68, and current outlet 70. Beneficial energy density and magnetic circuit efficiency result from a more compact arrangement of the conductors and their returns. Therefore, conductors are proximate tantamount to contact, requiring returns 80 of half of the conductors 40 to connect to current busses 68, 70 at a first depth (see inset A—A) while the returns 73 of the other half of the conductors 40 terminate at a shallower portion of the current busses so that the upper and lower returns overlap. This return arrangement may be used for most embodiments of the present invention having parallel electrical connections.

Figure 12:
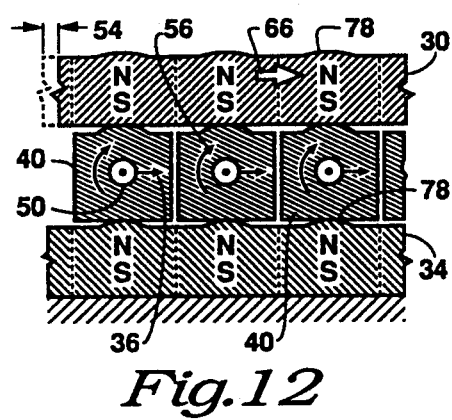
FIG. 12. A cross section view of an embodiment of the apparatus of FIGS. 10, 11 that is more easily fabricable by epitaxy.

FIG. 12 is a variant of the actuator layer of FIG. 10. Components have humps 78 only on the sheet surfaces facing upward in the figure, and on the upper surfaces of rollers 40, allowing easier manufacture by preferred methods. Sheets may be magnetized in segments (indicated by dashed lines) in order to achieve higher degrees of magnetization, or may be magnetized as units as are the sheets of the embodiments shown in FIGS. 10, 16 and 17.

Figure 13:
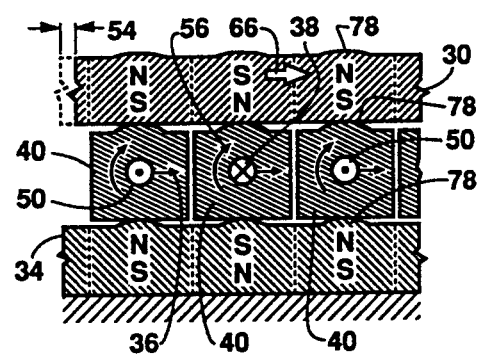
FIG. 13. A variant of the apparatus of FIG. 12 having segmented remanent sheets.

FIG. 13 is a variant of the components of FIG. 12 having the sheets magnetized in segments (indicated by dashed lines) with alternating poles, and alternating current directions 38 and 50 in respective conductive rollers 40. The returns of FIG. 5 and the upper-lower overlapping return routing of FIG. 11 to concentrate conductors may be used in this embodiment.

Figure 14:
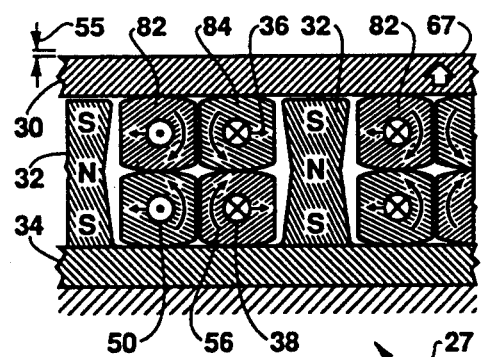
FIG. 14. A cross section view of a normal-acting actuator layer portion.

FIG. 14 is a section portion view of a lifter layer 27 comprising stationary sheet 34, movable sheet 30, fixed elements, here remanent ribs 32, conductive roller pair 82, having two rods, of a first circuit, and conductive roller pair 84, having two rods, of a second circuit. Currents 38 and 50, produce magnetic fields interacting with each other and with the fields of ribs 32 which cause conductor forces 36 that roll the rods with moments 56. The rolling surface of each rod has a radius larger than that of a round rod that fills the same space. During rolling the larger radii cause translation of sheet 30 in direction 67 by mechanical lifting stroke 55. Rolling surface shapes may be cylindrical segments, and alternatively may have predetermined shapes to achieve a desired relation between stroke and applied current. Sides of ribs 32 are concave to clear rod corners at stroke extremes while preserving the low magnetic path reluctance by reducing the gap length of the rib magnet portions near the sheets. Conductor returns similar to those of FIG. 23 are used. Reversing current direction in both circuits reverses the rotation direction of rods, but produces the same direction of lifter stroke 55. Lifter mechanical stroke is therefore a rectified transduction of an applied bidirectional electric current. The illustrated embodiment is appropriate to macroscopic applications of the present invention.

Figure 15:
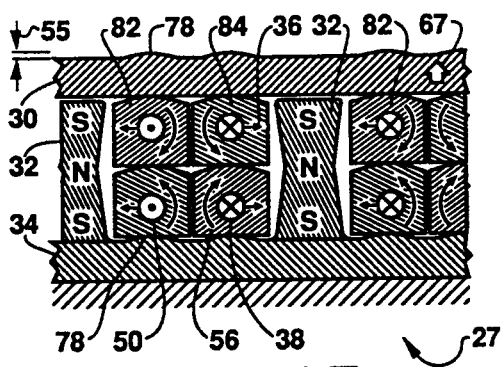
FIG. 15. A variant of the apparatus of FIG. 14 allowing easier epitaxial fabrication.

FIG. 15 is a section portion view of a variant of the layer of FIG. 14 having humps 78 only on upper component surfaces. This embodiment, suitably reduced in scale, simplifies microscopic actuator fabrication by preferred processes.

Figure 16:
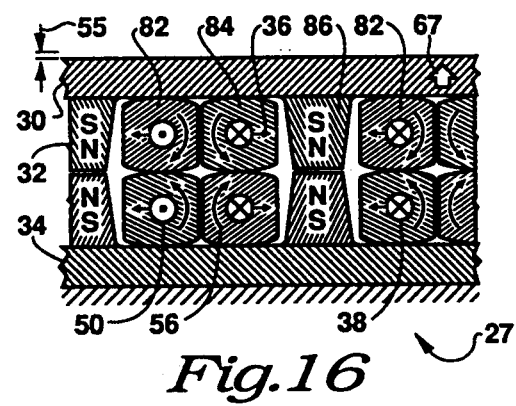
FIG. 16. A cross section view of a variant of the apparatus of FIG. 14 having planar symmetry.

FIG. 16 is an variant of lifter layer 27 of FIG. 14, having symmetry of construction about the middle plane. Opposing like remanent rib poles repel, thereby forcing sheets apart. Particular applications have preferred fabrication methods that benefit from symmetric arrangements of rib magnets. For example, shorter rib magnet portions allow more intense magnetization with a given magnetizing apparatus, and all sheets with attached magnets are alike to be manufacturable by like processes. Other methods benefit from having a permeable sheet between opposing magnet portions to concentrate magnetic fields.

Figure 17:
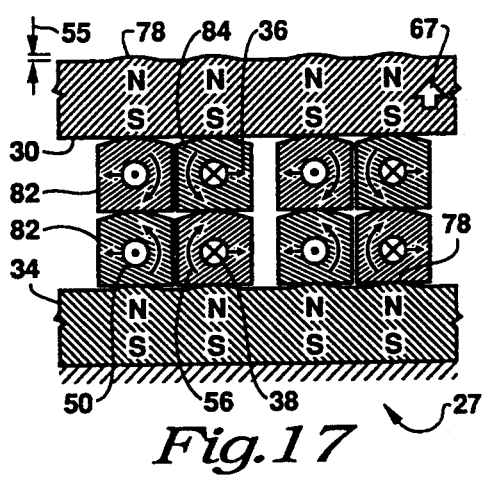
FIG. 17. A cross section view of a normal-acting actuator layer portion using remanent sheets.

FIG. 17 is a section portion of a lifter layer 27 comprising stationary magnet sheet 34, movable magnet sheet 30, and conductive roller pairs 82, 84. This embodiment has the magnetic field perpendicular to the broad sheet surfaces. Currents 38, 50 cause forces 36 and moments 56 that roll conductive rollers, resulting in lifter movement 67 by mechanical stroke 55. Magnetic intersheet attraction provides traction normal force for rollers. Upper component surfaces are provided with humps 78 to facilitate microscopic fabrication. A macroscopic variant of this lifter (not illustrated) uses rollers similar to those of FIG. 16.

Embodiments illustrated in FIGS. 14 through 17 have self-canceling inertial reaction forces of rollers. Cancellation of reaction forces benefits a diverse class of applications requiring relatively precise positioning without excessive perturbations. All sheets of the actuator body portion containing layers such as those of FIG. 17 are magnetizable at once.

FIG. 18 is a section portion view of a lifter layer 27 comprising stationary current sheet 34, movable current sheet 30, and magnetic roller pairs 90. Currents 38 and 50 create a magnetic field in direction 39, rolling roller pairs 90 that forcefully position sheet 30 in direction 67 by mechanical stroke 55. All magnets of the illustrated layer rotate and translate in the same direction without inertial reaction force cancellation. An alternate embodiment reverses the pole arrangement of half the rolling magnets of the layer to make each layer self canceling of inertial reaction forces. The lifting action of this embodiment is rectified.

FIG. 18 shows adjacent magnet pairs having opposing like poles. Magnet pairs of a layer therefore seek uniform lateral separation during assembly and operation. Layer compressing forces result from attractions between the magnets of one layer and those of adjacent layers when appropriate pole arrangements obtain. Like poles of a roller pair repel and are forced together by stack normal force. Vertically alternating north and south poles require attention to sheet current direction. However, the previously mentioned rectification preserves lifter function, allowing the choice of pole arrangement and current direction that largely cancel multilayer inertial reaction forces, one layer canceling the reaction forces of another, or one portion of a layer cancelling the reaction forces of another equal area portion of the same layer.

A variant of the layer shown in FIG. 18 has magnetic roller pairs arranged with alternating poles. This embodiment cancels inertial reaction forces because each magnet moves in the sense opposite to that of its neighbor. This alternate embodiment also provides layer compression forces needed for roller traction. Compression forces result from attraction of magnets with semipermeable sheets when used, and from attractions of magnets of one layer with those of adjacent layers. However, this embodiment causes magnets to attract each other, and results in a less concentrated magnet arrangement due to larger spaces between pairs to accommodate movement in opposite directions.

FIG. 19 is a section portion view of a variant 27 of the layer of FIG. 18 having humps 78 only on the upper surfaces of the components to facilitate microscopic fabrication using preferred methods.

The next set of embodiments of the invention, as shown in FIGS. 20 to 33, is directed toward actuators with relatively high electrical and mechanical efficiency, relying on electric currents in combination with magnetically permeable but essentially non-remanent materials.

FIG. 20 shows a cross section portion view of a tangenter body layer 28 comprising stationary sheet 34, movable sheet 30, a conductive roller 40 in tractive contact with sheets, and fixed elements or ribs 32, here made of a magnetically permeable material, hereinafter referred to as cores, affixed to sheet 34. Gap 60 between core 32 and movable sheet 30 prevents rubbing during forceful positioning. The layer portion is depicted at the instant of application of an electrical current to the conductor of roller 40 and before motion occurs. Roller 40 has returns as shown in FIG. 21. The instantaneous directions of the applied current flow symbolized by 50 toward the reader and 38 away from the reader. Current 50 produces a magnetic field circulating counterclockwise about the conductor centerline. Core 32, being permeable, concentrates the magnetic flux (not illustrated for clarity) into gap 44. Force 36 on conductor 40 causes mechanical moment 56 that rolls conductor 40. Cumulative traction by contacts 48, 58 translates movable sheet 30 in direction 66 by mechanical stroke 54. The forces and motions may be considered the result of motional reduction of magnetic flux path reluctance as previously described.

The force may be deduced by the method of images wherein core 32 may be replaced by a virtual electrical conductor carrying current in the same direction as conductor 40, located parallel thereto, and located the same distance from gap 44. Core 32 therefore provides an additional rolling force without an additional current.

Gap 42 separates core 32 from conductor 40 (of current 38) to reduce magnetic counterforces due to the clockwise magnetic field around current 38. Current 38 experiences force 36 and moment 56 similar to and in the same direction as those of current 50, thereby contributing further to force and translation 66 of movable sheet 30. When the direction of current flow in roller 40 is reversed from that illustrated in FIG. 20, forceful positioning in direction 66 is rectified as previously described. An embodiment of the actuator layer of FIG. 20 uses sheets 30 and 34 that are not magnetically permeable for applications in relatively intense external magnetic fields, and other applications that benefit from constructions using light weight materials. A preferred embodiment uses permeable sheet materials that further shorten the magnetic flux path length. Electromechanical efficiency increases inversely proportional to the magnetic path length.

FIG. 21 shows a simplified plan view of the components of FIG. 20, comprising conducting rollers 40, cores 32, stationary sheet 34, raised sheet surface portion 72, returns 76, and electrical connections 68, 70.

FIG. 22 is a bidirectional embodiment of the tangenter layer 28 of FIG. 20, comprising stationary sheet 34, movable sheet 30, a first conductive roller 40, a second conductive roller 51, and cores 32. At the instant of time when an electrical current is applied to first conductor 40, and before forceful positioning has occurred, current 50 flows toward the reader, and after a return, flows away from the reader 38. The current generates forces 36 in conductors 40 that cause moments 56. Moments 56 cumulatively forcefully position movable sheet 30 in direction 66 by mechanical stroke 54. Forceful positioning occurs as rollers 40 move to the right of the figure, thus reducing the magnetic reluctance of the gap between conductors and cores 32 as previously described. Rollers 51 receive no currents during stroke 54, but passively roll with the motion. Applying the same magnitude but opposite direction of current to rollers 40 produces the same magnitude and direction of force, the force being the rectified transduction of the bidirectional applied current. However, cessation of current in rollers 40 and commencement of flow in rollers 51 positions movable sheet 30 in direction 65 by mechanical stroke 57, providing bidirectional tangenter action by conductive roller switching.

A tangenter may be planar or curved in accordance with the path to be taken by the traction member of the actuator. The tangenter shown in FIG. 22 is shown with the curved variant appropriate to executing power strokes along the curved surface of a positioned object such as a motor shaft.

FIG. 23 shows a simplified plan view of the actuator layer of FIG. 22, comprising sheet 34, raised sheet portion 72, conductive rollers 40 of a first circuit 95, conductive rollers 51 of a second circuit 97, returns 76, permeable cores 32, and respective current connections 66, 68, 96, and 98 for the first and second circuits. Flattening of returns 76 prevents mechanical and electrical interference between the returns of circuits 95 and 97.

Figure 24:
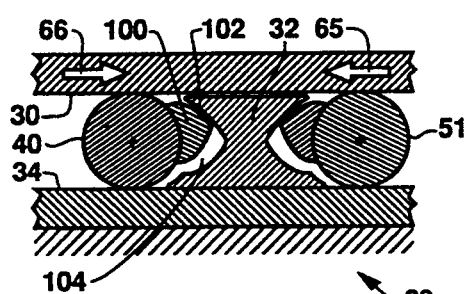
FIG. 24. A cross section view of a bidirectional forceful positioning actuator portion having involute permeable adjuncts.

FIG. 24 shows a variant 28 of the bidirectional actuator of FIG. 22, comprising stationary sheet 34, movable sheet 30, conductive roller 40 of a first circuit, conductive roller 51 of a second circuit, permeable core 32, and permeable adjuncts 100. Surface portions of cores 32 proximate adjuncts 100 have concave involute curves similar to gear teeth, while adjuncts 100 have similar convex involute curved surfaces. During roller motion, for example to the right in the figure, the magnetic reluctance of gap 102 remains essentially constant and relatively small, while the reluctance of gap 104 decreases with roller motion, thereby contributing to the force of positioning. The reluctance of the magnetic circuit of a conductor is halved when the reluctance of gap 102 is made insignificant compared to two equal gaps, thereby doubling the positioning force. Adjuncts 100, being permeable, further concentrate magnetic flux in working gap 104, further increasing electromagnetic efficiency. The bidirectional layer of FIG. 24 includes embodiments having previously described permeable and paramagnetic sheets.

Figure 25:
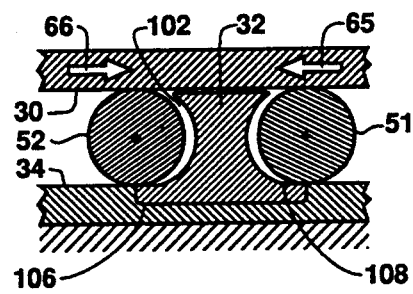
FIG. 25. A cross section view of a bidirectional forceful positioning portion having a relatively short magnetic flux path and concomitant relatively low reluctance.

FIG. 25 illustrates an embodiment of the bidirectional actuator layer comprising previously described and consistently numbered components, including cores 32 having circular cylinder surface portions forming working magnetic gaps 102. Flux concentrating extensions 106 are embedded in stationary sheet 34. The surface of extension 106 is flat up to location 108 and forms a path of relatively small reluctance through the lower rolling line contact. The embodiment of FIG. 25, even with paramagnetic sheets, essentially eliminates one of the two gap reluctances shown in FIG. 20. Therefore a single gap configuration has approximately twice the electromagnetic efficiency relative to two-gap variants. As previously described, current in roller 40 alone forcefully positions in direction 66 (FIG. 25), while current in roller 51 alone positions in direction 65.

Figure 26:
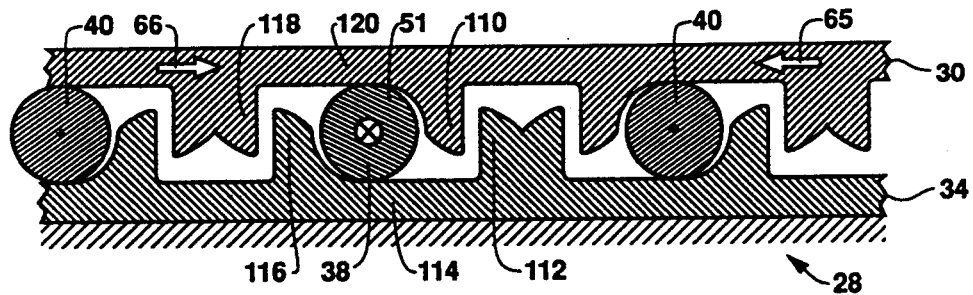
FIG. 26. A cross section view of a bidirectional tangential forceful positioning actuator portion having two circuits and induced pole pairs with relative movement.

FIG. 26 shows bidirectional tangenter or axier layer actuator portion 28 comprising stationary sheet 34, movable sheet 30, conductive rollers 51 of a first circuit, and conductive rollers 40 of a second circuit. Sheets are magnetically permeable and have rib poles configured to concentrate magnetic flux, such as rib poles 110, 112, 116, and 118. First and second circuits are alternately activated with current. For example, as conductive roller 51 carries current 38 away from the reader, and using the right hand rule, permeable rib poles and sheets establish magnetic flux primarily around path 110, 112, 114, 116, 118, 120, and back to 110. A relatively small counterclockwise moment is generated about roller 51, while a relatively large tangential force results from motional reduction of reluctances of gaps, primarily between pole pairs 110, 112 and 116, 118, thereby forcefully positioning movable sheet 30 in direction 66. Termination of current flow in rollers 51 and commencement of current flow in rollers 40 of the second circuit forcefully positions movable sheet 30 in direction 65. The shapes of rolling contact surfaces of the sheets is predetermined such that conductive rollers are kinematically stabilized yet relatively free to roll.

A variant of the layer of FIG. 26 includes portions of paramagnetic materials near rolling contacts to reduce the counter moment due to current images immediately proximate conductor rolling contacts. The embodiment of FIG. 26 also includes variants having two or more rollers between poles in order to improve electromechanical efficiency through reduced layer thickness, higher current density, and reduced rolling friction by further distribution of the contact stress of a given normal force. Current flow in the actuator layer of FIG. 26 creates an attractive force between sheets that aids in maintaining roller traction. A large class of applications rely solely on the inter-sheet attraction for intended function, without resorting to ancillary external normal forcing means. Another class of applications uses ancillary external normal forcing means in part to hold layers together during forceful positioning.

A variant (not illustrated) of the embodiment shown in FIG. 26 has even pole pairs, for example pole 116 proximate pole 118, lying parallel to arrow 66. This even pole arrangement eliminates the reluctance of half of the gaps, thereby more than doubling the effectiveness of the remaining working (odd) gaps. Another variant (not illustrated) has even gap planes lying at angles to the direction of action, the angle predetermined to obtain a desired combination of force, stroke, and change of force with stroke.

Figure 27:
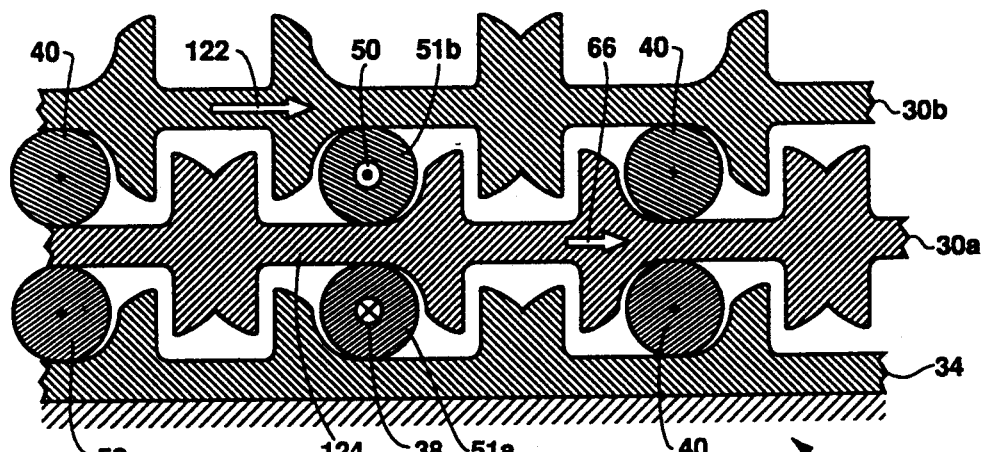
FIG. 27. A cross section view of a multilayer variant of the apparatus of FIG. 26.

FIG. 27 illustrates a multilayer variant 28 of the actuator layer of FIG. 26. The mechanical stroke 66 of movable sheet 30a is added to a similar stroke of movable sheet 30b, the sum of strokes being symbolized by arrow 122. At an instant, current 50 flowing toward the reader in conductive roller 51b and current 38 away from the reader in roller 51a cooperate by essentially doubling the magnetic flux induced in sheet portion 124. Assuming a magnetic flux density substantially lower than that which saturates the permeable sheets, adjacent conductor layers essentially double the actuation force generated by the sheet poles.

In the context of relatively large forces and small strokes, the multilayer actuator body portion offers increased electromechanical efficiency by reducing conductor segment motion, reducing the lengths of magnetic flux paths, constructively concentrating available magnetic flux, and reducing magnetic reluctance of working gaps by reducing gap size.

Tangenter and axier embodiments thus far described use circular rollers. It is to be understood that conductor cross section shapes other than round permit current density distributions differing in advantageous ways from those extant in circular conductors. Included in the scope of the present invention is the use of square or rectangular conductors, these being easier to fabricate by preferred methods referenced forward. Conductors with planar contact surfaces roll on curved protuberances added onto or integrally fabricated with sheets. Conductors having concaved rolling contact surfaces are also included, the rolling occurring on extensions of sheet rolling surface portions. Rolling between concave and convex contact surfaces reduces contact stress.

Figures 28, 29:
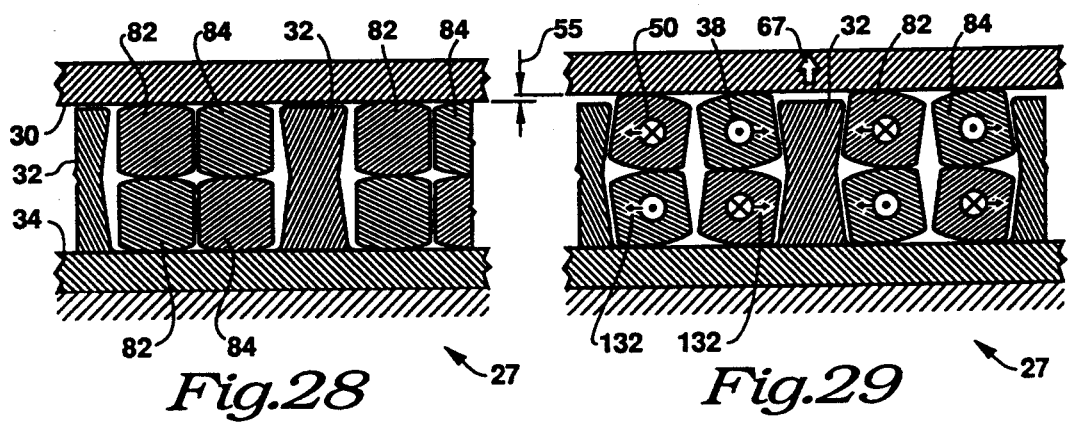
FIG. 28. A cross section view of the quiescent, mechanically centered state of a perpendicularly acting (lifter) actuator portion.
FIG. 29. The apparatus of FIG. 28 showing forcible perpendicular positioning accruing from applied currents.

FIG. 28 shows an electrically quiescent cross section portion view of a lifter actuator layer 27, comprising stationary sheet 34, movable sheet 30, conductive roller pair 82 of a first circuit, conductive roller pair 84 of a second circuit, and magnetically permeable cores 32. Lifter rolling conductors have returns similar to those shown in FIG. 23. Sheets are paramagnetic in one class, and permeable in a preferred class of embodiments. Rollers operate in pairs, each pair member carrying half the current. Currents of a pair flow in opposite directions. Roller contact surface portions have radii larger than those of circular conductors that fit the same space, thereby providing the lifting action.

FIG. 29 shows the electrically activated portion 27 of FIG. 28 wherein current 38 flows in the first circuit toward the reader and current 50 away from the reader in the second circuit. In the space between cores 32, current pairs are equal and opposite, have opposing mutual magnetic fields, and therefore repel. Rollers of this embodiment may be paramagnetic. Permeable cores 32 may be considered to contain induced image currents virtually flowing in the same direction as proximate real currents, therefore attracting the proximate conductor pairs to contribute to rolling. Roller forces 132 combine to cause rotation of pairs toward cores as illustrated. The rolling contact surfaces, having larger than circular radii, cause movable sheet 30 to translate in direction 67 with forceful mechanical lifting stroke 55. Included in the scope of the present embodiment are variants having permeable sheets, and other variants having permeable rollers. Lifting action is rectifying since forceful positioning of movable sheet 30 also proceeds as described when both current directions are reversed.

Figure 30:
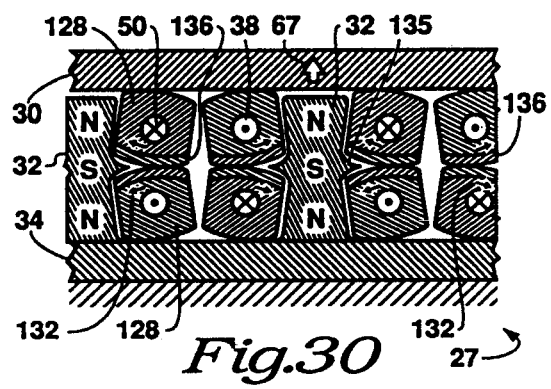
FIG. 30. A cross section view of an actuator portion in which permeable conductor adjuncts concentrate magnetic flux.

FIG. 30 shows a variant 27 of the actuator lifter layer of FIG. 29 wherein cores 32 include excrescences 135 between rollers to reduce magnetic reluctance. Surface rolling portions between rollers include integral permeable adjuncts 136 that concentrate magnetic flux, the effect being to move the roller forces 132 from the centroid of electric current density to a location closer to said permeable adjuncts. The greater moment arm of relocated force 132 increases actuating force by dint of the greater leverage. The magnetic poles induced in cores 32 are illustrated by N and S in accordance with the right hand convention.

Figure 31:
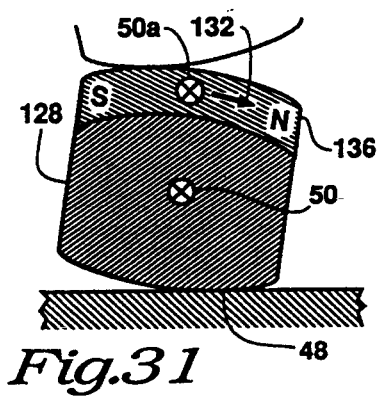
FIG. 31. An enlarged cross-section view of one conductor of FIG. 30 illustrating induced magnetic poles and the effect of current flow in permeable adjuncts.

FIG. 31 is an enlarged cross section of a conductive roller of FIG. 30, showing permeable adjunct 136 with induced magnetic poles N and S. In another embodiment, the roller passes current 50a through adjunct 136 as well as current 50 through roller body 128, thereby moving the location of the magnetic force closer to arrow 132. Given a magnitude of force, the moment about the lower rolling contact 48, FIG. 31, increases linearly with the distance that arrow 132 lies from contact 48. Lifting force 67, FIG. 30, therefore benefits from substantially greater leverage than that expected from lifter roller embodiments previously described.

A variant embodiment of the roller of FIG. 30 has no electrically insulating layer between conductive portions 136 and 128 since currents 50 and 50a flow in the same direction. The analogous electric circuit is that of two resistors connected in parallel and sharing current portions inversely proportional to their respective conductances. Another embodiment includes an electrically insulating layer between roller portions 136 and 128 so that currents 50 and 50a are simultaneously independently electrically controlled to limit the heat generated by permeable portion 136, this portion typically having an electrical resistivity relatively large compared to roller body portion 128. Independent current control provides beneficial extra actuating force, for example, during a relatively short initiating portion of a lifting cycle when reluctance has the largest value. Independent current control in portion 136 allows tailoring the force as a function of time during a lifting cycle, or as a function of conductor position to generate a lifting force and mechanical stroke that vary in a predetermined manner.

The embodiment of the actuator layer of FIG. 30 having permeable sheets increases lifter force by decreasing the reluctance of the magnetic flux path. Upper conductors create flux counterclockwise in movable sheet 30, while lower conductors create flux clockwise in fixed sheet 34. Core 32 is affixed to sheet 30, contributing insignificant reluctance to the whole magnetic circuit. The reluctance of the gap between core 32 and sheet 30 is reduced by reducing the gap height. The core gap increases as lifting proceeds, thereby increasing reluctance. A variation (not illustrated) uses permeable interdigitated sheet and core excrescences to render core gap reluctance small and relatively independent of lifter stroke.

Figure 32:
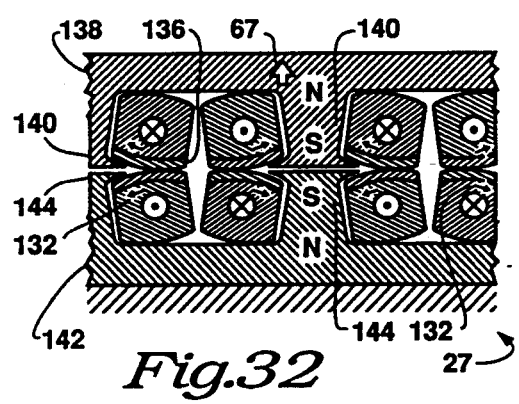
FIG. 32. A cross section view of a variant of the apparatus of FIG. 29 illustrating flux path reluctance reduction by pole shaping.

FIG. 32 shows a variant of the actuator lifter layer 27 of FIG. 30 having cores 140 and 144 expressed equally from opposing sheet faces, relegating the gap near the plane of magnetic layer symmetry. Relatively little magnetic flux passes through the symmetry plane, allowing relatively efficient actuation that is essentially independent of both core gap height and change of core gap height with lifter stroke.

Figure 33:
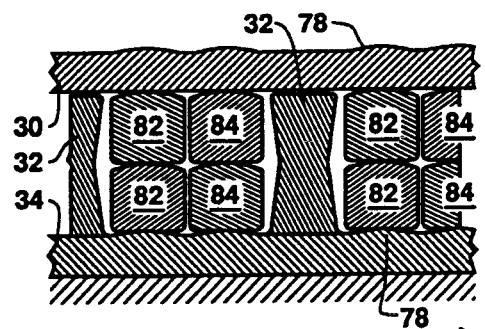
FIG. 33. A cross section view of a variant of the apparatus of FIG. 28 that simplifies manufacturing with a class of processes by the use of flat outer conductor surfaces and convex additions to sheets.

FIG. 33 is a cross section portion view of a variant 27 of the lifter layer of FIG. 28 having flat roller contacts rolling on curved integral humps 78 of the sheets.

Further embodiments of the invention, as shown in FIGS. 34 to 47, use electric currents of conductive rollers interacting with the currents of stationary conductive elements.

Figure 34:
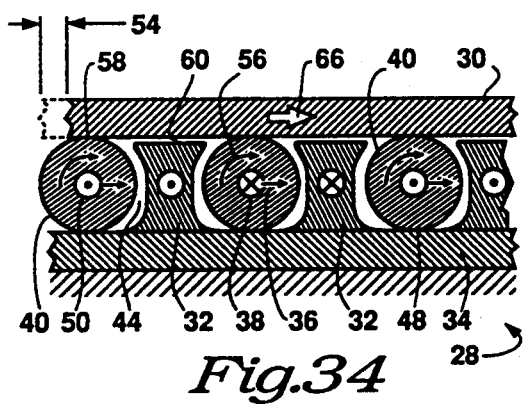
FIG. 34. A cross section view of a portion of one layer of the present actuator that supplies tangential motion and force.

Referring to FIG. 34, shown is a cross section view of one layer of a tangenter body layer 28 comprising stationary sheet 34, movable sheet 30, a fixed element or rib which is here an electrical conductor 32 affixed to stationary sheet 34, and conductive rollers 40 tractively retained between sheets 30 and 34. The layer is depicted in the quiescent state in which rollers 40 lie midway between ribs 32. This is predetermined to be the center of mechanical stroke.

When electrical currents are caused to flow in the rollers, illustrated in a direction toward the reader by symbol 50 and away from the reader by symbol 38, a magnetic field (not shown) is created around each conductor. The current of a roller incurs a force 36 in response to the magnetic field of its nearest neighbor, while the neighboring roller incurs a similar force. The mutual forces cause roller or rib attraction when the currents flow parallel, and repulsion when flow is antiparallel. Each roller also incurs a force in response to the magnetic fields of other nearby rollers and ribs.

However, the magnitude of the force is inversely proportional to the distance between rollers. Therefore, the force on each roller is the vector sum of the forces caused by all nearby conductors, the more distant ones contributing relatively lesser force components. Forces 36, by dint of rolling contacts 48, 58, result in moments 56 about the axes of rollers 40. The moments result in combined rotation and translation of each roller in the same direction as moment 56, while translating sheet 30 in direction 66 by mechanical stroke 54. Arrow 66 may also be considered a translation force vector that is the sum of the force contributions of all the rollers of the layer.

Mechanical stroke 54 is twice the distance traveled by the axis of each roller. Given a predetermined mechanical sheet stroke, the rollers translate half of that stroke thereby providing a motional mechanical advantage of two. Gap 44 between conductors is made small to benefit from the force inverse distance relation. A narrow gap generates greater force than a wide one. Gap 44 is made slightly larger than needed to clear at the extremes of roller movement. Gap 60 precludes rubbing of ribs 32. The shape of ribs 32 brings the magnetic flux as close as possible to rollers 40 in order to increase actuation force.

Figure 35:
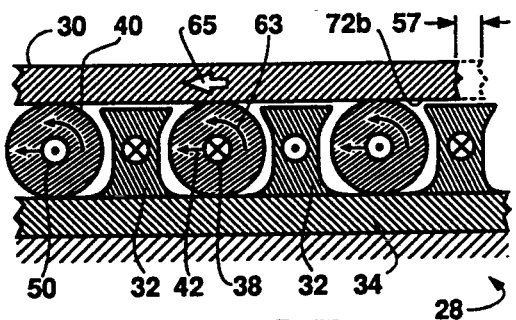
FIG. 35. A cross section view of the apparatus of FIG. 34 illustrating the effect of electric current reversal.

FIG. 35 illustrates the tangenter 28 of FIG. 34 but with the direction of current flow reversed in the ribs. Rollers 40 now incur forces 42 that cause rolling in the direction of moments 63, causing sheet 30 to move in direction 65 by stroke 57. Reversing the current direction in both conductors does not reverse the mechanical stroke direction. Changing the current direction in the ribs is arbitrary, since changing the flow direction in only the rollers will have the same effect as changing the direction only in the ribs.

Figure 36:
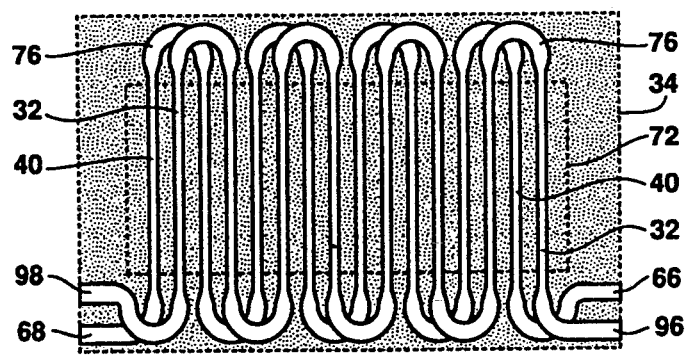
FIG. 36. A simplified plan view of a layer of the present actuator showing one conductor arrangement.

FIG. 36 is a plan view illustrating the effect of passing current in the directions shown in FIGS. 34 and 35, the conductors being applied as depicted. Stationary sheet 34 and movable sheet 30 have raised sheet portion 72 for contacting rollers 40. Rollers 40 and ribs 32 follow the serpentine path shown, with returns 76 flattened as previously described. The current connections 66, 68, 96, 98 may resemble those of the embodiment show in FIG. 23.

Figure 37:
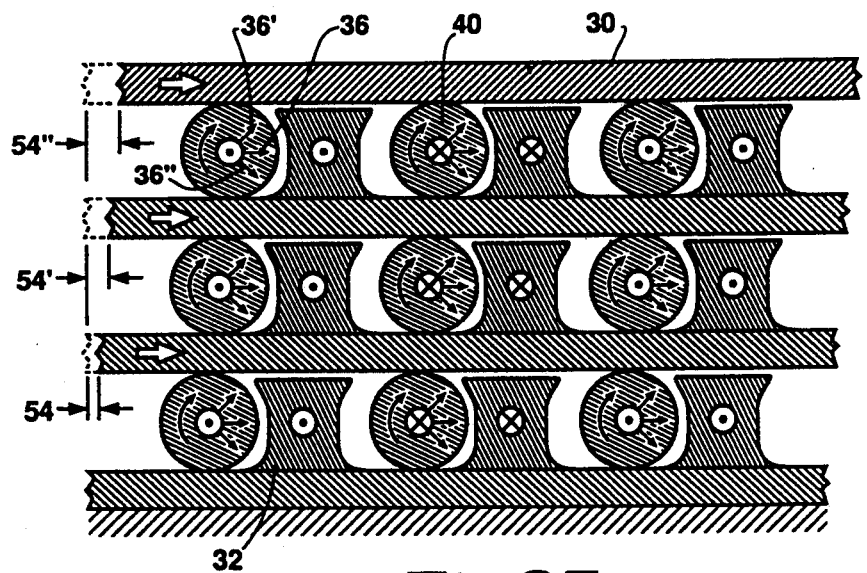
FIG. 37. A cross section of three layers of the present actuator illustrating the mechanical summing of stroke contributions and the benefits of current sheets.

FIG. 37 is a multilayer variant of the tangenter of FIG. 34, showing that force 36 on each conductive roller 40 is the sum of force contributions from the nearest and more distant neighboring conductors such as force components 36, 36' and 36". It is therefore to be understood that the force on a roller comprises a great many more contributions of force from neighboring conductors than is herein possible to explain with clarity.

Three of many possible layers of conductors are shown in FIG. 37. The bottom sheet is arbitrarily made stationary for reference. A predetermined stroke (force) 54 in the first movable layer is added to stroke 54' of the second layer, both of which are added to stroke 54" of the uppermost sheet. Each layer may be independently electrically addressable. A group of layers may be connected in electrical parallel. Alternatively, a group of layers may be connected in electrical series, depending on the requirements of a particular application. Regardless of the electrical interconnection of layers, the stroke of the top sheet is the sum of the stroke contributions of underlying layers. In FIG. 37, when each layer has the same stroke contribution, stroke 54" will be three times stroke 54.

Return paths can be eliminated by using straight conductive roller segments having enlarged rolling end portions that make ohmic contact with raised, insulated conducting busses of one or both sheets (not illustrated). An ohmic contact is herein defined as the passage of current through contacting surfaces of two distinct conductive bodies. In practice ohmic contacts increase in electrical resistance with use, with age, and after environmental degradation, ultimately failing by local excessive current density, or by inability to pass current altogether. The use of ohmic contacts is therefore not included in the body of preferred practice of the present invention. Preferred embodiments thus far described have no restoring forces such as gravity or springs. Application of a constant conductor current causes a constant force, assuming a constant magnetic field intensity (which rarely prevails in practiced embodiments of the invention). Disregarding for the moment that the geometry changes during roller and sheet movement, a constant force incurs a constant acceleration that changes velocity at each instant of time. In order to control the positioning by the actuator, it is desirable in a class of applications to control the current applied to each actuator layer in a predetermined manner such that the layer's positioned sheet attains a predetermined position with respect to time and force of positioning.

Figure 38:
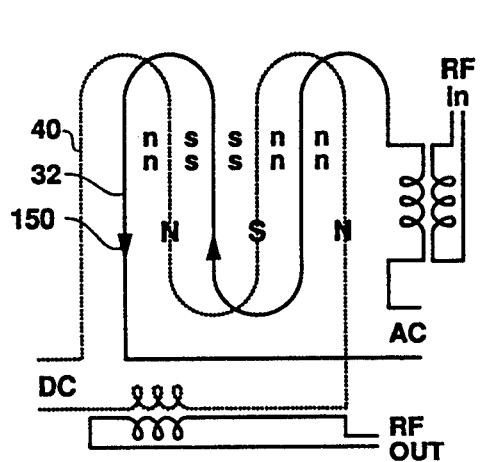
FIG. 38. A plan schematic conductor view depicting an inductive means of determining relative layer position used for closed loop control.

FIG. 38 shows schematically a subset of rollers 40 (dotted) and fixed conductors 32. In order to measure the position of the sheets, in addition to the currents producing motion, the rollers are activated with direct current indicated DC while the fixed conductors are stimulated with alternating current indicated AC. A coupling means, exemplified in the figure as a transformer, allows the superposition of a radio frequency signal RF onto the fixed conductor circuit. At an instant of time, current flow direction 150 in the fixed conductor circuit causes an RF instantaneous magnetic field designated upper case letters N as the north magnetic pole directed toward the reader, while the south magnetic pole S is directed away from the reader in accordance with the right hand rule and the winding direction of each corresponding loop. The RF magnetic field induces a voltage in the rolling conductor loop indicated by lower case letters n and s. Each voltage induced in a rolling conductor loop is proportional to the area intersected by the fixed loop. At the quiescent centered mechanical position depicted, all the induced voltages indicated n and s in the interior loops are equal in magnitude and opposite in sign, therefore mutually canceling. However, the end loops have a net surplus of n magnetic pole, or induced positive voltage, semiquantitatively illustrated by the figured number of n and s symbols. A similar coupling means, such as a transformer, allows the measurement of the net RF voltage induced in the rolling conductor circuit.

It should be understood that the described embodiment excited by DC, AC and RF is but one of a class of excitation arrangements that achieve results similar to those described, and that these classes of excitation arrangement are included in the scope of the present invention.

Figure 39:
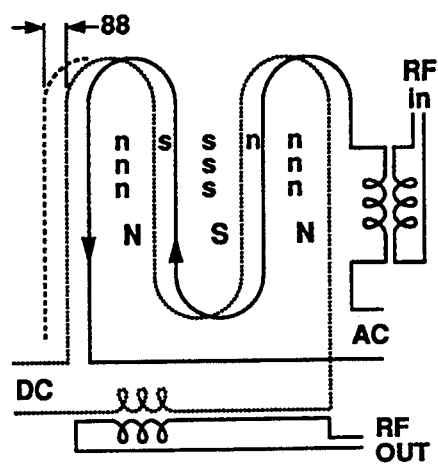
FIG. 39. The apparatus of FIG. 38 showing the effects of displacement of a portion of the conductors.

FIG. 39 shows the schematic view of the apparatus of FIG. 38 but with rollers displaced to the right by mechanical stroke 88. At an equivalent instant of time, again semiquantitatively depicted by the number of n and s symbols, indicated is an increase in the surplus of n magnetic poles induced, corresponding to the increased magnitude of induced positive RF voltage resulting from the repositioning. Conversely, movement of the rollers to the left induces a lower positive voltage. Therefore, the magnitude of induced voltage is a measure of relative layer position. Assuming perfect conductor geometry, only the end return paths contribute significantly to the variation of induced voltage that is used for determining in realtime the state of actuator layer relative position. The end returns may comprise only a few parts per thousand of the area of an actuator layer, whereas more accurate position determination accrues when every conductor contributes to the position responsive signal.

Figure 40:
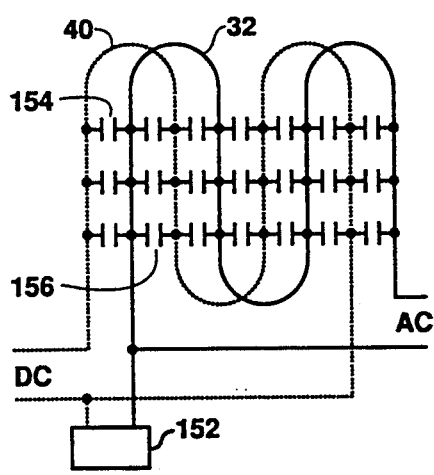
FIG. 40. A plan schematic view of a portion of an actuator layer illustrating distributed capacitance between conductors.

FIG. 40 shows a schematic plan view of an actuator portion like that of FIG. 38, comprising conductive roller circuit 40 shown dotted, fixed conductor circuit 32, and capacitance measuring means 152. Between segments of fixed and rolling conductors, in most applications, is an air gap (for example, 44, FIG. 34) that forms an electrical capacitor. A capacitance between rollers is essentially inversely proportional to the distance between them. Capacitors (virtual) 154 and 156 are represented in the figure by conventional symbols. In the mechanically centered position depicted, capacitance 154 is equal to capacitance 156, and the sum of capacitances is a minimum.

Figure 41:
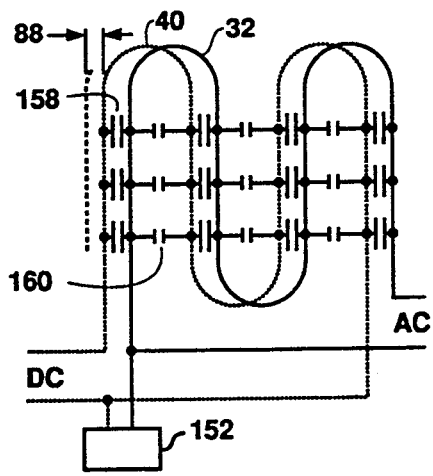
FIG. 41. The apparatus of FIG. 40 showing the detection of relative layer position achieved by relative capacitance measurement.

FIG. 41 is the schematic of FIG. 40 showing rollers displaced to the right by mechanical stroke 88, resulting in capacitance 158, by dint of increased propinquity, being greater than capacitance 160. Larger capacitances are illustrated larger in size as a qualitative representation. The sum of capacitances 158 and 160 is therefore larger than the sum of capacitances 154 and 156 of FIG. 40 due to the displacement of the rollers. Capacitance measuring means 152 thereby allows the electrical determination of relative sheet position that is used to control conductor current to produce a predetermined actuator stroke or force using feedback control (omitted from figures) well known in the art. A feedback controller generally achieves predetermined positioning without regard to the force generated by the layer of the actuator when the electromechanical coupling factor is relatively large and the applied current is within tolerable values.

The methods of measuring and controlling actuator stroke using induced voltage, measured capacitance, or a combination, are preferred because ancillary internal and external relative position measuring devices are obviated, internal wiring being no more complicated than that needed solely for actuator operation. However, another class of magnetic actuator applications may benefit from ancillary internal or external position measuring devices (not illustrated), these therefore being included in the scope of the present invention.

Many applications benefit from actuator layers that are electrically and mechanically connected in groups. When layer groups are used, the fixed conductors above or below, or both above and below a particular layer of a group, are activated with RF. The fixed conductor of the particular layer has an RF voltage induced therein that is a measure of relative layer position. All portions of the conductors thereby participate in position detection, affecting a sensitivity increase. Adjacent layers that are not members of a particular group are excited with RF of a different frequency, the induced RF voltage of the particular layer or group of layers being detected by a frequency-sensitive amplifier (not illustrated) to avoid confusion.

Figure 42:
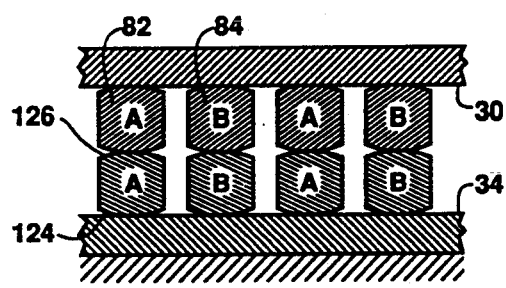
FIG. 42. A cross section view of the quiescent, mechanically centered state of a portion of the present actuator having paired rollers.

FIG. 42 shows a cross section view of a portion of a lifter actuator layer 27, comprising stationary sheet 34, movable sheet 30, conducting roller pairs 82 and 84, each pair having an upper and a lower roller. Lifter conductors may have the same serpentine loop layout as previously described. Previously described AC and DC circuits are respectively symbolized by B and A. FIG. 42 depicts the quiescent, mechanically centered state of the actuator. Each conductor has a lower curved surface portion 124 and an upper curved surface portion 126. Curved surface portions have a predetermined radius that is larger than a round wire that would fill the same space. Pairs of rollers roll on each other between the stationary and movable sheets.

Figure 43:
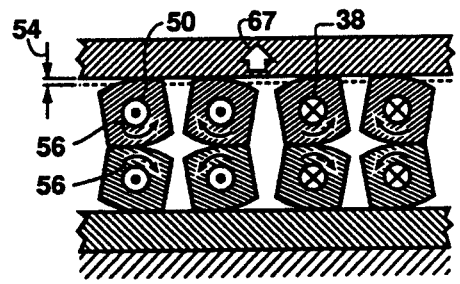
FIG. 43. The apparatus of FIG. 42 showing positioning accruing from applied currents.

FIG. 43 shows the view of the lifter of FIG. 42 at an instant of time when currents flow in directions 50 and 38 as symbolized previously. Rollers are free to rotate in response to mutual magnetic attractions and repulsions, in accordance with the relative directions of current flow. Conductor forces cause moments 56 that, by dint of the aforedescribed curved surface portions, cause movable sheet 30 to move in lifting direction 67 by mechanical stroke 54. Contacting conductors of a pair carry the same magnitude and direction of current at all times and are therefore not required to be insulated from each other, but may be insulated at rolling line contacts with sheets which are also electrically conducting. It should be clear that the conductor pairs labeled A (in FIG. 42) move in directions opposite to the direction moved by conductor pairs labeled B, thereby canceling inertial reactive forces and any tendency of lifter conductor displacements to give rise to net relative tangential sheet forces.

Figure 44:
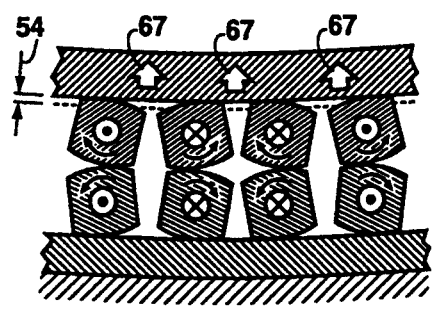
FIG. 44. The apparatus of FIG. 43 illustrating the effects of current reversal in a subset of actuator conductors.

FIG. 44 shows the apparatus of FIG. 43 wherein the direction of current flow in the B conductors is reversed, resulting in the same displacement 67 and stroke 54 as before in FIG. 43. Rectified sheet displacement somewhat complicates the use of Fourier stimulation to be described subsequently.

The lifter of FIG. 44 is also shown curved as an example of the variant used to position a traction member along a curved path. An application of the curved lifter is in a hydrostatic or hydrodynamic bearing having electrically and dynamically controlled lubricant film thickness. Upper sheet 30 lies proximate the curved surface of a rotating shaft and confines the lubricating fluid. Film thickness is decreased as the lifter lifts, causing sheet 30 to move radially toward the shaft in directions 67, entailing a sheet translation and a change in curvature of the sheet. Radial movements 67 converge on the shaft axis in this embodiment.

Figure 45:
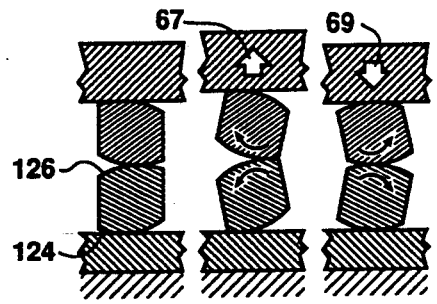
FIG. 45. A cross section view of one pair of rollers in three positions showing the effect of applied currents.

FIG. 45 shows variant roller pairs in three positions, quiescent, with movement to the left, and with movement to the right. Roller curved surfaces 124 and 126 have a predetermined asymmetric shape, such as cylindroidal, such that left roller movement causes movable sheet displacement in upward direction 67, while right roller movement displaces the movable sheet in downward direction 69. At least one shape of cylindroidal surface causes the mechanical stroke to be proportional to the magnitude of the applied current. Applications that require a large lifter force generated by asymmetric rollers may render such rollers kinematically stable by elastic energy storage between counter-rotating roller pairs. Energy storage and concomitant restoring force may be affected by compression of matter between roller pairs, such as sponge-like elastomers, and compacted springy filaments.

Figure 46:
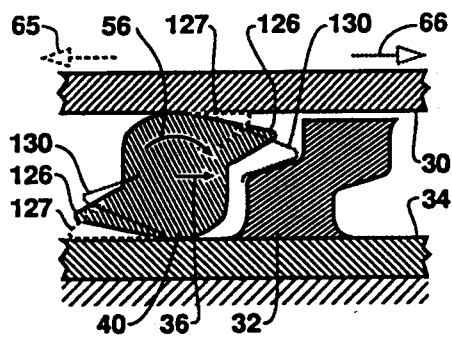
FIG. 46. A cross section view of a rolling and a fixed conductor illustrating the beneficial effects of variant conductor cross section shapes.

FIG. 46 is a cross section view of a variant actuator tangenter layer portion comprising stationary sheet 34, movable sheet 30, rib or core 32, and roller 40. Rollers and ribs have cross section shapes predetermined to increase force 36 and moment 56, given a predetermined maximum current. Greater force and torque result from magnetic flux concentration due to the advantageous redistribution of current or flux by lobed shapes. Roller 40 has a shape which may also be tailored to linearize force as a function of current when called for by a particular application. Linearizing shapes entail the use of predetermined spirals on opposing magnetic gap surfaces, one example being the involute. The movable sheet 30 can therefore be moved in directions 65 and 66 without lifting. Quiescent roller lobe positions are shown at 126. A negative full half stroke is shown by dashed lines 127, while a positive half stroke is shown by dotted line 130, graphically illustrating the change of geometry that determines the reluctance of the magnetic circuit.

Another conductor variant further enhances the force per unit current by the use of non-uniform current density. More conductive portions of a cross-sectionally isotropic conductor are concentrated at predetermined locations in order to concentrate magnetic flux to locations predetermined to accentuate actuator force.

Figure 47:
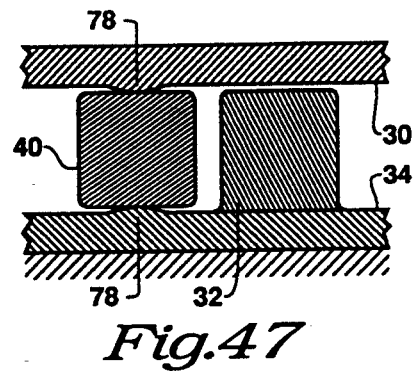
FIG. 47. A cross section view of conductor variants allowing relatively easy fabrication.

FIG. 47 shows a variant of an actuator tangenter layer having convex rolling surface humps 78 integral with one or both sheets 30, 34 rather than as parts of the rollers themselves. The resulting roller, bounded by planar surfaces, is more easily fabricated by some preferred processes.

Yet another variant (not illustrated) has convex rolling surfaces on both rollers and on sheet surface portions. A further variant uses the previously described forms in combination with concave rolling surface portions either on the sheets or on the rollers, the object being the amelioration of rolling contact stresses for applications incurring relatively large loads.

Although variants of the present invention using only currents may be devoid of ferromagnetic materials, conductor circuits have small but finite electrical inductance. All actuator embodiments cyclically activated circulate a relatively large quantity of electrical power that is preponderantly inductively reactive, only a small portion of which is converted to mechanical work per unit time. Relatively high actuator efficiency obtains when the electrical drive means conserves reactive power during circulation.

The preferred drive means for the magnetic actuator is the multiresonant drive method called Fourier stimulation, particularly when an application requires relatively high electrical and mechanical efficiency. In a multilayer actuator, subsets of layers of one actuator are electrically connected in a circuit with the corresponding layers of another like actuator. Also connected in the circuit is a coupling and stimulating means such as a capacitive or inductive connection. Each subset is stimulated in electrical (but not necessarily mechanical) resonance at a predetermined frequency and amplitude determined by application of Fourier's theorem. Each subset therefore contributes a sinusoidal mechanical stroke portion to the output action of the actuator. Therefore the inductances of the inductive layers of the magnetic actuators become energy storage components, obviating any need for separate reactive components in the electric drive means.

The traction member of each Fourier stimulated actuator is positioned with the mechanical stroke sum of the subset contributions. Subset frequencies and amplitudes are selected in accordance with Fourier rules for a predetermined nonsinusoidal mechanical stroke wave form, for example, the triangle tangenter and rectangular lifter wave forms suitable for smooth walking. The obviation of separate reactive components to temporarily store and circulate reactive electrical power substantially reduces the size, weight, and complexity of the apparatus, while retaining the high system efficiency derived from the preservation of high electrical efficiency of resonant operation, and the high mechanical efficiency of smooth walking.

Fourier stimulation allows relatively flexible modes of stimulation. A short pulse delivered to the input of each stimulator contains very little more energy than needed to keep each circuit amplitude at the value dictated by the Fourier rules and the operating requirements, and to replace energy that is being converted to mechanical work. Stimulating pulses are delivered anywhere during the rising portion of each sine (walking speed) or cosine (walking power) wave, analogous to supplying an impulse to a child riding a swing. Stimulation pulse shape is relatively less important than the power delivered, this being the area under the pulse amplitude vs. time curve. The coupling factor of the coupling-stimulating means is easily adapted to activate the actuator using a wide variety of electrical sources, such as switched DC, switched AC, conventional power mains, marine and aircraft mains, and power busses of orbital space facilities.

The electrical resistance of normal materials causes internal heating. The effective actuator energy density is increased in proportion to the rate at which internally generated heat can be removed. Fluids are forced through interconductor clearances (shown in most figures) for cooled actuator embodiments. Heat is more quickly removed from myriad minified conductors because of the relatively larger surface area to volume ratio. Miniature conductors are sufficiently cooled by interconductor forced convection in many applications, allowing simpler actuator component construction.

Cooled macroscopic actuator embodiments have fluid channels (not illustrated) internal to the conductors. Maximum energy density obtains when actuators have cooling channels internal to magnets, sheets and conductors. Embodiments having cooling fluid supplied to and removed from internal channels by closed tubing operate in a vacuum without cooling fluid exposure or loss. Internal cooling microchannels increase the energy density in minified actuator embodiments and are included in the scope of the present invention, despite increased epitaxial fabrication difficulty.

A consequence of interconductor cooling is exposure of all rolling line contact traction surfaces to the coolant. Preferred forced convection interconductor cooling fluids are gasses and liquids that enhance traction rather than act as lubricants. Liquids customarily used to lubricate and cool industrial traction machines, such as smoothly variable speed transmissions, are sufficiently tractive to operate satisfactorily in the preferred embodiments of the present invention. However, coolants that offer no lubricative action whatever will allow actuators to deliver their utmost conversion of electrical to mechanical power. Relatively large area traction surfaces may have a grid of shallow grooves (not illustrated), analogous to rain tire tread grooves, permitting egress of fluids during high speed lifter actuation.

Figure 48:
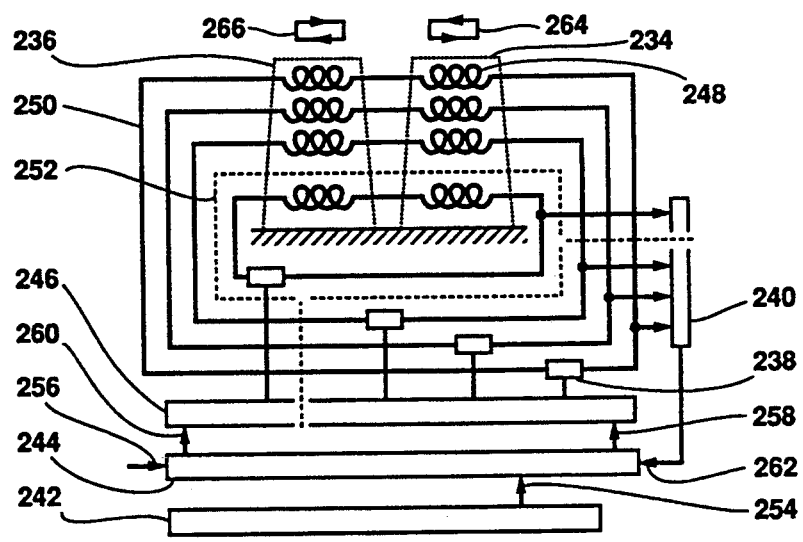
FIG. 48. A schematic actuator system diagram using a preferred electric drive means.

FIG. 48 schematically illustrates an actuator system comprising walking actuator 234, walking actuator 236, electrical coupling and stimulation means 238, position measurement means 240, electrical power source 242, controller 244, and Fourier coefficient calculator 246. Actuator layers are symbolized by inductances 248. Each inductance may be a single layer, and alternatively, may consists of a group of two or more layers electrically connected. An inductance of actuator 234 is connected in a circuit with the corresponding inductance of actuator 236 and with one of the coupling and stimulation means 238 by typical wires 250. An actuator of the schematic may represent two or more actuators connected in electrical parallel and performing equivalent mechanical actions. Dashed lines 252 graphically indicate that a larger number of circuits may be used than shown in the figure.

The accuracy of approximation of a desired mechanical stroke wave form improves with the number of groups contributing to the Fourier sum. The wave form accuracy needed depends on the requirements of a particular actuator application. Actuator activation requires the application of electrical power 254 and externally supplied positioning data 256. Using the positioning data, controller 244 distributes electrical power to Fourier coefficient calculator 246. Fourier coefficient calculator 246 supplies signals needed for the preferred smooth walking, namely, the frequencies and amplitudes 258, 260, needed by the circuits of the tangenter and the lifter. The coupling and stimulation means 238 couples into each loop 250 the electrical power that is to be converted to mechanical work by the actuators, plus an increment of power to overcome internal losses, if any.

Large currents associated with circuit resonance are restricted to the loops themselves, including only the loop portions of the coupling and stimulation means. The electrical resistance of the loop portion of the coupling and stimulation means has a low value predetermined by the efficiency requirements of a particular actuator application. Fourier frequency coordination between actuator layer groups is preferably managed by phase locking using the highest Fourier frequency extant in the system as a reference.

Position measuring means 240 supplies the controller with signals 262 representing relative layer positions. The controller corrects errors of relative layer position with externally required position by varying stimulation amplitudes supplied by the Fourier coefficient calculator. Each layer or group of layers of an actuator thereby contributes a portion of the mechanical stroke. Actuator 234 has a mechanical stroke 264, illustrated counterclockwise, that is the mechanical sum of the layer stroke contributions, while actuator 236 has a clockwise stroke 266. Motion path sense is arbitrary and is thus illustrated for clarity, while actual actuator action direction is arranged appropriate to a bipedal (or multi-pedal) walking action. One of the actuators is generally installed in a positioning apparatus rotated by a half turn to simplify electrical connections. When mechanical wave forms are symmetric, the two actuators, or the two groups of actuators execute power stroke portions alternately. For example, actuator 234 may be applying mechanical work to a movable object while actuator 236 is retracing. Coordinated lifter and tangenter forces smoothly transmit mechanical power to the positioned object when bipedal smooth walking is used.

Variants of the controlling means using one actuator in each circuit may have independently electrically controllable actuator wave forms. This variant is used for multiphase motors and positioners. Multiphase motors allow a larger fraction of the actuators to execute forcing strokes at every time instant.

It should be understood that the present invention is also intended to be used with varying degrees of smooth walking. Rough walking, herein defined as tractive positioning of an object with a predetermined amount of sliding and a predetermined variability of applied force. These alternative modes of activation are achieved with mechanical stroke wave forms that differ from those used for smooth walking. Rough walking uses any mechanical walking wave form commensurate with the desired life of the traction surfaces. Particular rough walking applications may also relax limits for acoustic noise level and elastic perturbations of the positioned object.

It should also be understood that all layers of a tangenter may be electrically connected and driven by a single time-varying electrical source, such as a class A power amplifier, a switcher-regulator using a direct current source, and the like. A lifter may also be driven as an electrical unit. Rough walking is particularly beneficial to a large class of actuator application that require relative simplicity of electrical drive circuitry at the expense of relatively lower mechanical and electrical efficiencies. An example of the latter class is a linear actuator that replaces a hydraulic cylinder that makes relatively few powerful but relatively slow strokes during its useful life.

A constant potential or a constant current electrical drive means, when switchably connected to the present reactive actuator embodiments, produces a current that varies nonlinearly with time. In the past, the assumption of constant source potential or constant source current has simplified calculation of circuit response. Both constant potential or current sources are idealizations that are difficult to practice in all but particular circuits under special conditions that have relatively little relevance in the context of the present invention. However, the nonlinear responses of practical electrical drive sources are herein employed with advantageous electrical efficiency by tailoring such responses to behave in a multiresonant manner that is clearly distinguished from the classical single-frequency, sinusoidal resonance analogous to the simple pendulum. Prescribed drive means may offer the electrical efficiency of resonance (multiresonance) while not behaving as an electrical pendulum, and while not producing a continuous sinusoidal electrical signal. For example, the hindquarter of a kangaroo is a nonsinusoidal multiresonant system during hopping, temporarily storing and recycling substantially more energy in heel and tail tendons that used to traverse level ground. Cycling energy storage is efficient and hopping without rubbing is mechanically efficient, affording the animal a survival advantage evinced by its presence.

Nonlinearity of stroke-force responsive to magnitude of applied current may be to a degree inherent in any particular design of the present magnetic actuator, even those intended to have linear response, because linearity is an idealization only approximated by practice. Variation of stroke and force with magnitude of applied current depends in a complex manner on the electrical characteristics of the electrical activation means, on the nature of the mechanical load, and on the electromechanical response of an actuator layer. The latter also includes variations of response due to the change of magnetic path caused by roller movement. In addition, layer response is in part dependent on the speed of activation and operation.

Each embodiment of the present invention includes a variant having nonlinear positioning and force responsive to the magnitude of applied current. Configurations of the motional and electrical characteristics of an actuator layer, the electrical properties of the drive means, and the timing of activation of the system are systematically predetermined to provide a nonlinear stroke-force action in accordance with the requirements of a particular application. By way of example, given a prescribed variation of applied current with time (that is generally nonlinear), a nonlinear lifter layer produces a stroke in the form of a rectangular wave, while similarly, a nonlinear tangenter produces a triangular wave form, both waveforms coordinated to produce smooth walking as previously described. It is emphasized that the motional waveform, a complex function of current, position and time, and the current waveform, a direct function of time and an indirect function of roller position, are assumed to be nonlinear, while the prescribed combination produces the desired mechanical stroke waveform. It is also emphasized that a fully functional actuator as the present invention may comprise but a single lifter layer and a single tangenter layer, the improvement being a simplification and compaction of construction, and a simplification of electrical drive means. In principle, the simplest actuator lifter may have a single roller and a tangenter may have a single roller pair, kinematic stabilization being provided externally. However, multiroller embodiments advantageously improve actuator performance as previously explained, as well as providing kinematic stability. Single- or dual-roller microminiature embodiments suit applicants such as motive means for microscopic robots and the like.

The example motor application illustrated in FIG. 2 has actuators comprised of outer lifter layers and inner tangenter layers. While a lifter applies tractive normal force it must move the entire tangenter portion with attached traction member while sustaining all tangenter forces. Proper motor function requires lifters having relatively large structural rigidity in the direction of tangenter forcing. The preferred direction of lifter rollers is therefore parallel to tangenter motion and forcing. In example FIG. 3 lifter rollers parallel to direction 26 provide the largest translation force on rod 24.

Three axis actuators, for example FIG. 2 with lifter, tangenter and axier, have rollers of the lifter parallel to at least the tangenter or the axier. In three-axis applications stiffness may be attained electrically rather than mechanically. Relatively high electrical stiffness obtains through relatively low power source electrical impedance.

The nature of traction requires that the lifter apply a normal force that is greater than the largest tangential force by the same factor as the inverse of the rolling static coefficient of traction. In a large class of actuator applications the normal force is relatively high, certainly much higher than that supplied by the mere weight of the apparatus, and commonly larger than can be supplied by practical springs. Therefore the preferred actuator lifter supplies all necessary tractive normal force rather than external exigencies such as springs or gravity. Gravity is not necessary to described function, allowing zero- and micro-gee operation.

Because of the relatively large normal force, multi-pair actuators operated alternately hold the positioned object in a vise-like grip at all times. Groups of three actuators provide kinematic stability for most shapes of positioned object, particularly cylinders such as shafts and axles. Alternating the traction member action of the actuators provides the function of zero-clearance bearings without rubbing.

Actuators of the present invention are preferably designed with robustness sufficient to sustain the relatively large forces inherent in tractive positioning. The robustness of construction, in combination with the endemic zero-clearance of the bearing function fulfilled by the traction members provides the relatively high structural rigidity necessary to achieve relatively high positioning precision.

Precision of object positioning by the present actuator is high relative to other positioning devices. Other devices are at best no more precise at positioning than allowed by internal or ancillary position sensors. Most positioners rely on bearings and linkages. An arbitrarily precise position sensor in these compliant devices can only partially compensate for bearing and linkage clearances, and elastic compliances associated with Hertzian contacts referenced forward, therefore achieving at best a fraction of the precision afforded by very precise position sensing.

Macroscopic components are preferred when the present invention is enlarged to relatively large size, such as prime movers for heavy vehicles, marine vessels and the like. Macroscopic variants of actuators are easily made of ordinary wire and sheets of appropriate material. Specially shaped conductors other than round are easily drawn or rolled by dies of the appropriate configuration. The choice of conductor material will follow the needs of a particular application. For example, a class of applications having moderate structural stiffness uses an alloy of copper such as Narloy Z ™ (a trademark of Rockwell International Corporation). This alloy has roughly the strength of steel, the electrical conductivity of oxygen-free high-conductivity copper, and a moderate elastic modulus comparable to copper and its alloys.

Preferred conductor insulation is by surface treatment with electrical insulators other than organic coatings. For example, in situ metal oxides have relatively high tractive contact durability compared to organic films. The preferred insulation for aluminum conductors is deep anodizing, generally having an oxide coating thickness of approximately 8 microns (micrometers).

Sheets 30 and 34 are made of electrical non-conductors. Alternatively, sheets 30 and 34 are made of electrical conductors having external surfaces rendered electrically non-conductive by a predetermined surface treatment, preferably in situ ceramic metal oxides and the like. Magnetic materials are selected with appropriate electrical conductivity in accordance with the needs of the particular embodiment.

The preferred method of fabricating the present invention when scaled to small, miniature and microscopic sizes forms relatively small actuator components by one or more of the techniques of microminiature manufacturing, such as epitaxial deposition, photolithography, chemical etching and the like. Actuator efficiency increases with component minification due to the previously described inverse distance relation of magnetic field intensities and forces. Force per unit applied current increases with diminishing air gaps in accordance with shortening of magnetic flux circuits. Small conductor dimensions permit a larger number of conductors in a given rolling contact surface width, thereby adding a larger number of force contributions to the mechanical stroke. More closely spaced conductors also increase actuator stiffness through improved electromechanical coupling. Applications requiring relatively high stiffness derive the preponderance of stiffness through the rigidity of the electrical drive means, commensurate with the electromechanical coupling factor of the actuator. Electrically derived rigidity increases with increasing electromechanical coupling factor, which in turn increases with decreasing component size.

In both macroscopic and microscopic embodiments, a compliant substance (not shown in figures) may be added to a portion of the space between conductors for stability and retention. Example stabilizing substances are polymers with predetermined degrees of mechanical compliance, silicone rubbers, and rubbery linear polymers. Polymers that are applied in the vapor phase, such as poly-paraxylylene, are preferred for microscopic embodiments.

Alternatively, conductors may be retained by sheet extensions (not illustrated) that trap conductors without restricting rolling. Extensions are preferably integrally fabricated with the sheets and of similar materials. Electrically conducting extension materials use an insulation composition that permits microsliding during initial actuator operation with predetermined minimum friction and wear debris generation. After initial actuator operation, rollers are mechanically centered and retained by intersheet traction, therefore requiring no further frictional participation of the retaining extensions.

The preferred current-only embodiment of the present invention includes no ferromagnetic materials, and therefore avoids the internal losses due to hysteresis and ferromagnetic eddy currents. In the absence of hysteresis, actuator force is more nearly proportional to the applied current, as nonlinearities due to magnetic saturation cannot occur. Actuators of the present invention will easily survive repeated exposure to very intense magnetic fields without permanent damage, albeit, may not function as desired in some fields. Ferromagnetic materials have a Curie temperature analogous to piezoelectric materials above which desired function is permanently or temporarily impaired. The absence of ferromagnetic materials in the current-only embodiments of the present invention elevates the operating temperature to a relatively high value well suited to a diverse class of relatively hot applications. Eliminating ferromagnetic materials, generally found in the middle of the periodic table of elements, allows construction of actuators using only elements having relatively low atomic number (Z). The use of low-Z materials minimizes nuclear activation of materials of construction, allowing safer conditions during maintenance and routine operation.

A diverse class of intense radiation applications may be advantageously filled by low-Z actuators, one advantage being relatively infrequent nuclear transmutations that otherwise render devices undesirably radioactive after irradiation. For example, copper and silver have many relatively long-lived and dangerous daughter isotopes that disintegrate with ionizing radiation, while aluminum, magnesium, lithium and beryllium do not. Specific gravity is generally lower with low-Z materials, allowing the construction of relatively light weight positioners and forcers using the current-only embodiments of the present invention. Light weight devices fill applications having relatively high transportation costs, such as delivery to orbit.

Some applications may require actuator forces larger than can be produced by currents lower than those that melt the common conductors such as copper, silver, and aluminum. Many relatively high temperature superconductors are fabricated by common macroscopic means and by epitaxial deposition. A class of superconductors, being composed of various metal oxides, has ceramic-like physical properties. Relatively high compressive stress is borne better by ceramics than shear and tension stresses. It should be clear that the present actuator benefits from imposing predominantly compressive stresses on the load-bearing rollers.

The walking actuator of the present invention also derives relatively higher mechanical efficiency when elastic compliances are relatively low. Any actuator compliance relegates a portion of each forcing stroke to elastic deformation of the actuator body, the positioned object, and the actuator support means. A low device structural compliance increases the power delivered to a positioned object, given a particular set of operating conditions.

The contact between a rolling component and a sheet is linear rather than Hertzian. A Hertzian contact is defined as having a point-like contact area, such as occurs when a sphere is pressed onto a plane surface. The mechanical stiffness of a Hertzian contact increases by an exponential function from a relatively low value at low contact force, to higher values at high contact force. At pressures sufficient for desirably high contact stiffness, the compressive and shear stress of the Hertzian contact just interior to the sphere-plane contact surface may exceed allowable limits imposed by most materials. Operation at or above safe stress levels causes gradual if not catastrophic destruction of the contact surfaces. In contrast, the present actuator's non-Hertzian, linear contact has an elastic stiffness that is essentially independent of the contact load. Given a prescribed load, non-Hertzian contacts entail relatively low compressive and shear stresses in the vicinity of the contact. Therefore, large loads are relatively easily borne by myriad rolling cylinder-plane contacts acting in unison and sharing the load, as the rolling line contacts in the apparatus shown in FIG. 2. Indeed, building the area of rolling conductor contact sufficiently large relative to a predetermined normal force prevents contact stresses from exceeding the values above which long-term fatigue becomes observable or life shortening. Applications entailing very large forces benefit from the uniform distribution of normal force over the entire footprint of the traction member. In apparatuses entailing a component if rotation associated with the translation component of the striding traction member, such as rotary motors and forcers, the component of rotation is easily supplied by the layers of curved tangenters or axiers.

It is well known that apparent strength increases with mechanical component minification. Despite a relatively larger ratio of surface area to volume in miniature components, there is less surface area in which to find minute flaws that contribute to material weakness. An extreme example is a component made of a single crystal having relatively few lattice defects. The preferred microminiature manufacturing methods benefit the present invention by providing relatively high durability when components are highly stressed. In addition, rolling components are free of rubbing except for a vanishingly small component of micro-rubbing due to rolling contact. In combination with smooth walking, free of gross rubbing during traction cycles, the present actuator has relatively few and benign life-shortening mechanisms.

Springs and other ancillary restoring force components are not used in the preferred embodiment of the present invention, thereby avoiding fatigue due to spring bending. However, a diverse class of actuator applications requires a restoring force not otherwise attainable electrically, by permeability, or by force of remanence. Springs in the present context do not include those used to provide a permanent component of actuator body compression referenced forward. However, return force springs may be incorporated (not illustrated) integrally between sheets as part of, or as adjuncts to fixed conductors, or between sheet edges. As previously described, some actuator embodiments may have rolling components that mechanically rectify an applied bipolar electric drive signal, thereby providing electrically controlled force only in one direction. These embodiments may rely on springs for elastic counter forces. Many applications require the actuator to supply a constant force to the positioned object. When no springs are used, the current needed to supply a constant force does not exceed the force externally exerted by the positioned object. In contrast, any springs acting in the tangenter or axier forcing direction will require an increment of current to deform the spring. During a forcing stroke portion by the actuator, work is done on the positioned object. When springs are used, work is also done in bending the springs. The elastic energy is temporarily stored in the springs, but may not be returned to the drive means because of retrace. Therefore, actuators with springs will generally require somewhat larger operating currents than those without springs, and will incur a relatively lower duty cycle, being able to supply a lesser amount of useful work or power to the positioned object under a given set of operating conditions.

Actuators operating with relatively high mechanical efficiency require complete clearance during retrace between the traction member and the surface of the positioned object. Actuators without springs or internal self compression therefore have relatively little control of body layer thickness during retrace because normal force is absent. When the actuator body is essentially free in a direction perpendicular to the broad surfaces of the layer sheets (normal direction), some residual retrace rubbing may occur. Retrace rubbing is avoided by applying a normal compressive force to the actuator body. The preferred embodiment uses tension links (not illustrated) rotatably or flexurally attached between the edges of the traction member and the support means to which the actuator body is attached. Tension members supply the necessary body compression needed to avoid rubbing during retrace. The compression also maintains the tractive retention of rolling components between sheets. Tension links are aligned parallel to or at a small angle to the lifter action direction and offer essentially complete mechanical compliance to tangenter and axier motion. Essentially infinite tangential compliance of the tension links detracts insignificantly from tangenter or axier power delivery. The tensile spring constant of the links is predetermined to supply sufficient body compression while not adding excessive force that the lifter must overcome in order to apply the desired normal force of contact of the traction member to the positioned object.

A remanent or excited embodiment of the present actuator operates as a generator when the lifter is externally electrically activated, electrical power over and above excitation being extracted from the tangenter circuit while, in the excited case, excitation current is applied to one of tangenter conductors. Electric excitation means that recycle excitation currents provide relatively high generator efficiency. Embodiments of the present invention, other than those incorporating remanent materials but including embodiments having permeable components, also operate as generators when exciter currents are applied to layer conductors in a manner that creates internal magnetic fields from which another forcefully rolled conductor is positioned to extract useful electrical power.

The present actuator makes relatively short power strokes. However, power strokes of walking magnetic actuators may easily exceed those of comparable piezoelectric actuators because the latter limit elastic deformation strains below rupture values. In contrast, the rolling components of the walking magnetic actuator easily achieve a power stroke an order of magnitude larger than their piezoelectric counterparts. Given a stroking frequency, the surface speed attained by the walking magnetic actuator will exceed that of the equivalent piezoelectric actuator by the same factor.

A further embodiment of the invention combines electrodeformable material layers such as piezoelectric layers in some body portions with magnetic actuator layers in other body portions to form a hybrid actuator.

Figure 49:
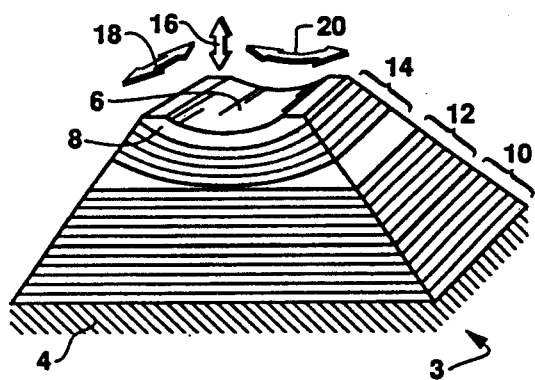
FIG. 49. A perspective drawing of an electric walking actuator having a layered body and a traction member.

FIG. 49 shows a perspective view of a 3-axis actuator generally indicated 3 comprising a mounting base surface portion 4, a traction surface portion 6 of traction member 8, and layered actuator body portions 10, 12 and 14. This embodiment is the same as that shown in FIG. 1 except it has an additional curved layered body portion 14. Electrical connections are omitted for clarity. The traction member and body portions may be integrally constructed. The actuator forcefully positions traction surface 6 in predetermined directions when separate electric signals of predetermined magnitude and polarity are applied to corresponding body portions. Body portion 10, a lifter, causes positioning of traction member 8 in direction 16. Body portion 12, an axier, positions traction member 8 in direction 18. Body portion 14, a tangenter, acts in directions 20 along a curved path. A layered body structure is indicated in the figure by parallel lines.

Preferred embodiments have many layers of a body portion, layers being connected in electrical parallel but producing mechanical action that is the sum of the motional contributions of the layers of the portion. Each actuator portion, relative to mounting surface 4, adds its sum motion to the motions of each successive body portion. The traction surface of member 8 is curved to fit the surface of a positioned object, and moves with the vector sum of motions of all layers of the actuator. Traction member positioning directions 16, 18, and 20 may be orthogonal linear or curved paths, and alternatively may act along predetermined relative angular directions.

Figure 50:
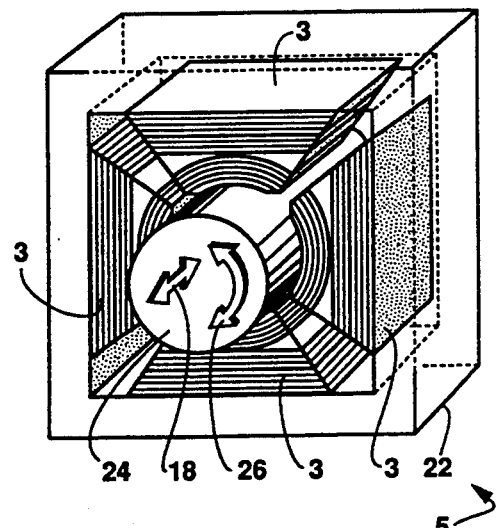
FIG. 50. A perspective partially ghosted view of a 2-axis motor application of the present invention.

Referring to FIG. 50, shown is a partially ghosted perspective view of a positioner assembly 5 comprising housing 22, actuators 3 similar to those shown in FIG. 49, and a shaft 24. Activations of lifters (10 of FIG. 49) force traction members against shaft 24. Tangenters (14 of FIG. 49) cause shaft 24 to rotate in directions 26. Axiers (12 of FIG. 49) cause shaft translation in directions 18.

Figure 51:
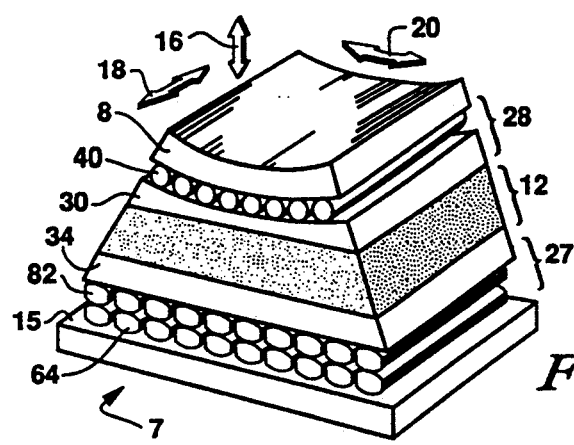
FIG. 51. A perspective drawing of a 3-axis hybrid actuator having a magnetic tangenter, a piezoelectric axier, and a magnetic lifter.

Referring to FIG. 51, shown is a perspective view of a three-axis hybrid actuator 7 comprising base 15, traction member 8, tangenter 28, axier 12, and lifter 27 having roller pairs 82. Traction member 8 is positioned respectively in directions 20, 18 and 16 by tangenter 28, axier 12 and lifter 27. Tangenter 28 is magnetic with rollers 40 paraxial with directions 18. Tangenter 28 is therefore inherently motionally rigid in directions 18 and derives rigidity in directions 20 by electrical means. Axier 12, further comprised of electrodeformable material, such as ferroelectric or piezoelectric material layers to form an actuator body portion, is inherently rigid in all directions. Lifter 27 is of the magnetic type having roller pairs 82 having motional rigidity in directions 18 while rigidity in directions 20 is derived electrically. The hybrid actuator of FIG. 51 is most rigid in directions 18, parallel to the axis of the shaft of the example device of FIG. 50.

The positioner of FIG. 50, using the hybrid actuators of FIG. 51 positions axially with relatively large forces. A magnetic axier in place of the piezoelectric one shown, would have rolling components perpendicular to direction 18 and would therefore may be relatively compliant in direction 18. The hybrid actuator embodiment of FIG. 51 illustrates one acting layer for each axis of motion. Other variants (not illustrated) may have two or more layers acting for each actuator portion motional direction.

Figure 52:
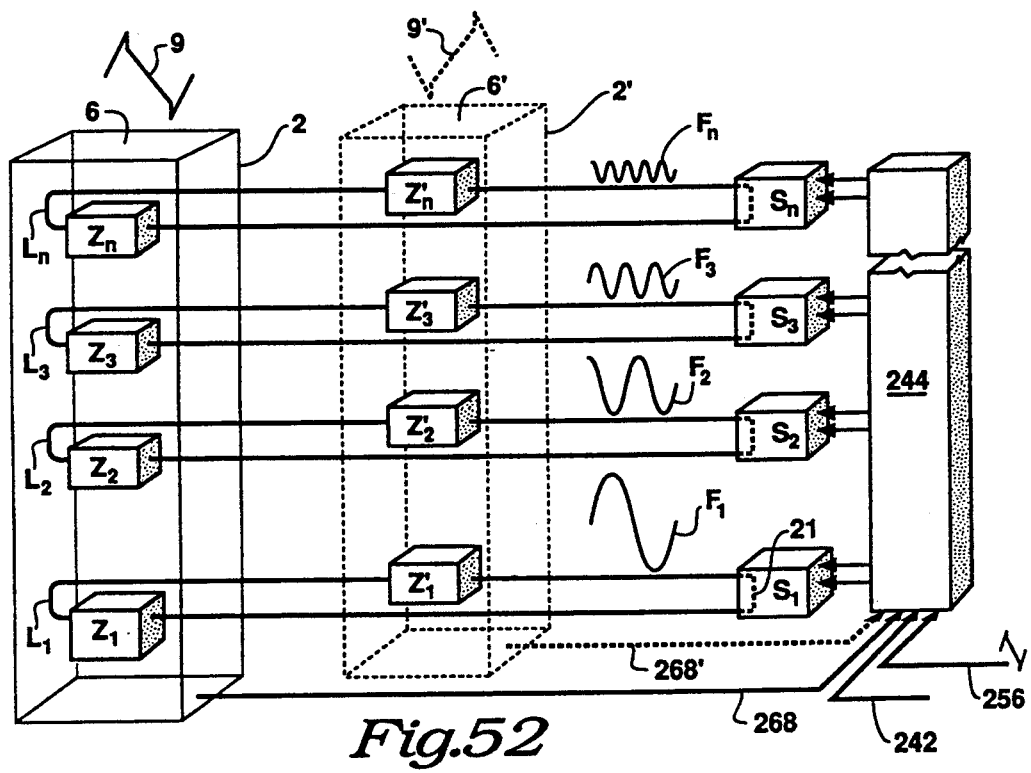
FIG. 52. A schematic drawing of an hybrid actuator assembly control system using a preferred drive means.

FIG. 52 shows a schematic system diagram of a preferred controller embodiment of the present invention with the object of making clear the benefits of hybrid embodiments that include body portion which deform responsive to a combination of electric and magnetic forces. The system of FIG. 52 comprises controller 244, a multiplicity of stimulators $S_1 \ldots S_n$ a multiplicity of impedances $Z_1 \ldots Z_n$, electrically segmented and structurally integral actuator 7, and a multiplicity of electrical loops $L_1 \ldots L_n$. Electrical segments of actuator 2 represented by a multiplicity of impedances $Z_1 \ldots Z_n$ are independently electrically addressable. Loop $L_1$ electrically connects actuator impedance $Z_1$, impedance $Z'_1$, and the loop portion 21 of stimulator $S_1$. The electric power receiving portion of stimulator $S_1$ is connected to controller 244. Other loops are similarly connected and have similar functions.

External electrical power is applied to controller 244 from power source 242. External position data 256 to operate actuator 2 are sent to controller 244. Using the supplied instructions, controller 244 internally calculates the manner in which electrical power is distributed to stimulators $S_1 \ldots S_n$. The electrical amplitude supplied to each stimulator is a periodic function of time.

Each loop is driven into electrical but not necessarily mechanical resonance by its stimulator. The frequency, amplitude, phase and polarity in each loop, represented by $F_1 \ldots F_n$, are determined by the controller in accordance with actuator instructions 256. Integral actuator structure results in vectorially summed transduction at the traction surface portion 6 of the actuator, which is the actuator output, in the form of a non-sinusoidal wave form 9 (smooth walking tangenter wave form in this example).

Resonance is aided by the temporary electrical energy storage by each loop impedance $Z'$. Impedance $Z'$ may be a separate component in some embodiments. In other embodiments, the output portion of loop portion 21 of a stimulator may be an energy storage impedance circuit portion in place of the separate impedance component shown $Z'$. However, in a preferred embodiment, energy storage impedances $Z'_1 \ldots Z'_n$ are the corresponding impedance segments of a like actuator 2' (dashed lines) with traction surface portion 6' that produces transduction 9' which is the compliment action as that of actuator 2.

Fourier's theorem may be used to select frequency, amplitude, phase and polarity of each resonance, represented by $F_1 \ldots F_n$, that produce vector sum 9 of actuator output contributions. The preferred method is analogous to the method of synthesizing a predetermined non-sinusoidal electrical wave form by electrically adding a multiplicity of sinusoidal signals. However, the present invention is distinguished from the electrical Fourier sum by the fact that the electrical sum is virtual and to be found nowhere in the circuitry of the present system. Absence of mechanical resonance also distinguishes the present invention from the electromechanically resonant apparatus described previously.

The controller 244 of a variant of the present invention uses feedback electrical signals 268, such signals representing actuator output state, the position of traction surface 6, and may also represent the relative positions of integral motional actuator segments to more accurately produce the desired wave form. Feedback allows partial correction of any actuator nonlinearity of response. Feedback may also apply nonlinearity to the synthesis of a desired waveform. Electrical signals 268 may also include information on the state of the intensity of stimulation in one or more loops, although the preferred embodiment performs this function in the stimulators (sensing circuitry omitted for clarity).

Using ancillary impedances as resonant controller components benefits system compactness and relative simplicity of construction. Inclusion of temporary energy storage impedances $Z'$ that are electric segments of another similar actuator as resonant components of the controlling means further benefits compactness and simplicity of construction. Even further compaction and simplification of interlayer electrical connections obtains in variants of the present invention in which a motional segment of an actuator incorporates both inductive and capacitive reactances that co-resonate.

The above specification may be more readily understood with reference to applicant's U.S. Pat. No. 4,928,030 issued May 22, 1990, U.S. Pat. No. 5,043,621 issued Aug. 27, 1991, applicant's copending application Ser. No. 07/697,368 filed May 9, 1991, and applicant's copending application Ser. No. 07/743,069 filed Aug. 9, 1991 which is a continuation of Ser. No. 07/488,548 filed Mar. 5 1990, all of which are hereby incorporated by reference.

Obviously, many modifications and variations of the present invention are possible in light of the above teachings. It is therefore to be understood that, within the scope of the appended claims, the invention may be practiced otherwise than as specifically described.

What is claimed is:
1. A magnetic actuator layer comprising:
two parallel sheets;

a roller, the roller being between the sheets and having rolling line contacts on the sheets;

a means for applying a current to the actuator for producing an electromagnetic force between the roller and the sheets, the electromagnetic force acting on the roller causing the roller to roll which moves at least one sheet relative to the other by way of the rolling line contacts of the roller on the sheets.

2. A magnetic actuator layer as in claim 1 wherein said roller moves at least one sheet parallelly with respect to the other sheet.

3. A magnetic actuator layer as in claim 1 wherein said roller moves at least one sheet normally with respect to the other sheet.

4. A magnetic actuator layer as in claim 1 wherein said roller moves at least one sheet curvedly with respect to the other sheet.

5. A magnetic actuator layer as in claim 1 wherein the sheets are flat.

6. A magnetic actuator layer as in claim 1 wherein the sheets are curved.

7. A magnetic actuator layer as in claim 1 wherein, said current produces a magnetic force between the roller and a rib on at least one sheet.

8. A magnetic actuator layer as in claim 1 wherein, said current produces a magnetic force between the roller and a portion of at least one sheet.

9. A magnetic actuator layer as in claim 1 wherein, the sheets are flat, said current produces a magnetic force between the roller and a rib on at least one sheet, said roller moves at least one sheet parallelly with respect to the other sheet.

10. A magnetic actuator layer as in claim 1 wherein, the sheets are curved, said current produces a magnetic force between the roller and a rib on at least one sheet, said roller moves at least one sheet curvedly with respect to the other sheet.

11. A magnetic actuator layer as in claim 1 wherein, the sheets are flat, said current produces a magnetic force between the roller and a rib on at least one sheet, said roller moves at least one sheet normally with respect to the other sheet.

12. A magnetic actuator layer as in claim 1 wherein, the sheets are curved, said current produces a magnetic force between the roller and a rib on at least one sheet, said roller moves at least one sheet normally with respect to the other sheet.

13. A magnetic actuator layer as in claim 1 wherein, the sheets are flat, said current produces a magnetic force between the roller and a portion of at least one sheet, said roller moves at least one sheet parallelly with respect to the other sheet.

14. A magnetic actuator layer as in claim 1 wherein, the sheets are curved, said current produces a magnetic force between the roller and a portion of at least one sheet, said roller moves at least one sheet curvedly with respect to the other sheet.

15. A magnetic actuator layer as in claim 1 wherein, the sheets are flat, said current produces a magnetic force between the roller and a portion of at least one sheet, said roller moves at least one sheet normally with respect to a planar surface of the other sheet.

16. A magnetic actuator layer as in claim 1 wherein, the sheets are curved, said current produces a magnetic force between the roller and a portion of at least one sheet, said roller moves at least one sheet normally with respect to the other sheet.

17. A magnetic actuator layer as in claim 9 having a magnetically permeable rib, the roller having a conductor wherein the current produces the magnetic force and induces a magnetic field in the rib.

18. A magnetic actuator layer as in claim 9 having a remanent rib, the roller having a conductor wherein the current produces the magnetic force.

19. A magnetic actuator layer as in claim 9 having a conductor in the rib, the roller having a conductor, wherein currents in the conductors produce the magnetic force.

20. A magnetic actuator layer as in claim 9 having a remanent roller, the rib having a conductor wherein the current produces the magnetic force.

21. A magnetic actuator layer as in claim 9 having a magnetically permeable roller, the rib having a conductor wherein the current produces the magnetic force and induces a magnetic field in the roller.

22. A magnetic actuator layer as in claim 10 having a magnetically permeable rib, the roller having a conductor wherein the current produces the magnetic force and induces a magnetic field in the rib.

23. A magnetic actuator layer as in claim 10 having a remanent rib, the roller having a conductor wherein the current produces the magnetic force.

24. A magnetic actuator layer as in claim 10 having a conductor in the rib, the roller having a conductor, wherein currents in the conductors produce the magnetic force.

25. A magnetic actuator layer as in claim 10 having a remanent roller, the rib having a conductor wherein the current produces the magnetic force.

26. A magnetic actuator layer as in claim 10 having a magnetically permeable roller, the rib having a conductor wherein the current produces the magnetic force and induces a magnetic field in the roller.

27. A magnetic actuator layer as in claim 11 having a magnetically permeable rib, the roller having a conductor wherein the current produces the magnetic force and induces a magnetic field in the rib.

28. A magnetic actuator layer as in claim 11 having a remanent rib, the roller having a conductor wherein the current produces the magnetic force.

29. A magnetic actuator layer as in claim 11 having a conductor in the rib, the roller having a conductor, wherein currents in the conductors produce the magnetic force.

30. A magnetic actuator layer as in claim 11 having a remanent roller, the rib having a conductor wherein the current produces the magnetic force.

31. A magnetic actuator layer as in claim 11 having a magnetically permeable roller, the rib having a conductor wherein the current produces the magnetic force and induces a magnetic field in the roller.

32. A magnetic actuator layer as in claim 12 having a magnetically permeable rib, the roller having a conductor wherein the current produces the magnetic force and induces a magnetic field in the rib.

33. A magnetic actuator layer as in claim 12 having a remanent rib, the roller having a conductor wherein the current produces the magnetic force.

34. A magnetic actuator layer as in claim 12 having a conductor in the rib, the roller having a conductor, wherein currents in the conductors produce the magnetic force.

35. A magnetic actuator layer as in claim 12 having a remanent roller, the rib having a conductor wherein the current produces the magnetic force.

36. A magnetic actuator layer as in claim 12 having a magnetically permeable roller, the rib having a conductor wherein the current produces the magnetic force and induces a magnetic field in the roller.

37. A magnetic actuator layer as in claim 13 having a magnetically permeable sheet portion, the roller having a conductor wherein the current produces the magnetic force and induces a magnetic field in the sheet portion.

38. A magnetic actuator layer as in claim 13 having a remanent sheet portion, the roller having a conductor wherein the current produces the magnetic force.

39. A magnetic actuator layer as in claim 13 having a conductor in the sheet, the roller having a conductor, wherein currents in the conductors produce the magnetic force.

40. A magnetic actuator layer as in claim 13 having a remanent roller, the sheet having a conductor wherein the current produces the magnetic force.

41. A magnetic actuator layer as in claim 13 having a magnetically permeable roller, the sheet having a conductor wherein the current produces the magnetic force and induces a magnetic field in the roller.

42. A magnetic actuator layer as in claim 14 having a magnetically permeable sheet portion, the roller having a conductor wherein the current produces the magnetic force and induces a magnetic field in the sheet portion.

43. A magnetic actuator layer as in claim 14 having a remanent sheet portion, the roller having a conductor wherein the current produces the magnetic force.

44. A magnetic actuator layer as in claim 14 having a conductor in the sheet, the roller having a conductor, wherein currents in the conductors produce the magnetic force.

45. A magnetic actuator layer as in claim 14 having a remanent roller, the sheet having a conductor wherein the current produces the magnetic force.

46. A magnetic actuator layer as in claim 14 having a magnetically permeable roller, the sheet having a conductor wherein the current produces the magnetic force and induces a magnetic field in the roller.

47. A magnetic actuator layer as in claim 15 having a magnetically permeable sheet portion, the roller having a conductor wherein the current produces the magnetic force and induces a magnetic field in the sheet portion.

48. A magnetic actuator layer as in claim 15 having a remanent sheet portion, the roller having a conductor wherein the current produces the magnetic force.

49. A magnetic actuator layer as in claim 15 having a conductor in the sheet, the roller having a conductor, wherein currents in the conductors produce the magnetic force.

50. A magnetic actuator layer as in claim 15 having a remanent roller, at least one sheet having a conductor wherein the current produces the magnetic force.

51. A magnetic actuator layer as in claim 15 having a magnetically permeable roller, the sheet having a conductor wherein the current produces the magnetic force and induces a magnetic field in the roller.

52. A magnetic actuator layer as in claim 16 having a magnetically permeable sheet portion, the roller having a conductor wherein the current produces the magnetic force and induces a magnetic field in the sheet portion.

53. A magnetic actuator layer as in claim 16 having a remanent sheet portion, the roller having a conductor wherein the current produces the magnetic force.

54. A magnetic actuator layer as in claim 16 having a conductor in the sheet, the roller having a conductor, wherein currents in the conductors produce the magnetic force.

55. A magnetic actuator layer as in claim 16 having a remanent roller, at least one sheet having a conductor wherein the current produces the magnetic force.

56. A magnetic actuator layer as in claim 16 having a magnetically permeable roller, the sheet having a conductor wherein the current produces the magnetic force and induces a magnetic field in the roller.

57. A magnetic actuator layer as in claim 18 wherein the roller snakes between the ribs and the ribs have poles which alternately reverse so as to consistently apply a force in one direction due to the magnetic forces.

58. A magnetic actuator layer as in claim 57 wherein the roller has a circular cross section.

59. A magnetic actuator layer as in claim 23 wherein the roller snakes between the ribs and the ribs have poles which alternately reverse so as to consistently apply a force in one direction due to the magnetic forces.

60. A magnetic actuator layer as in claim 59 wherein the roller has a circular cross section.

61. A magnetic actuator layer as in claim 18 wherein the current in all the rollers travels in the same direction and the ribs have poles which are all in the same direction.

62. A magnetic actuator layer as in claim 61 wherein the roller has a circular cross section.

63. A magnetic actuator layer as in claim 23 wherein the current in all the rollers travels in the same direction and the ribs have poles which are all in the same direction.

64. A magnetic actuator layer as in claim 63 wherein the roller has a circular cross section.

65. A magnetic actuator layer as in claim 40 wherein the conductor portion of the sheets are centered relative to the rollers, the conductor portion of one sheet carries currents which are all in the same direction and opposite the direction of the currents in the other sheet, and the poles in the rollers are all aligned in the same direction.

66. A magnetic actuator layer as in claim 65 wherein one sheet has a hump on which the roller pivots and the roller has a hump which contacts the other sheet thus allowing the roller to pivot on both sheets.

67. A magnetic actuator layer as in claim 45 wherein the conductor portion of the sheets are centered relative to the rollers, the conductor portion of one sheet carries currents which are all in the same direction and opposite the direction of the currents in the other sheet, and the poles in the rollers are all aligned in the same direction.

68. A magnetic actuator layer as in claim 67 wherein one sheet has a hump on which the roller pivots and the roller has a hump which contacts the other sheet thus allowing the roller to pivot on both sheets.

69. A magnetic actuator layer as in claim 38 wherein both the sheets have remanent portions having poles all aligned the same way and centered relative to the rollers, the conductors all carrying current in the same direction.

70. A magnetic actuator layer as in claim 69 wherein the rolling element has a circular cross section.

71. A magnetic actuator layer as in claim 43 wherein both the sheets have remanent portions having poles all aligned the same way and centered relative to the rollers, the conductors all carrying current in the same direction.

72. A magnetic actuator layer as in claim 71 wherein the rolling element has a circular cross section.

73. A magnetic actuator layer as in claim 38 wherein at least one of the sheets has a remanent portion having poles, the poles all aligned in the same direction, the rollers all carry current in the same direction and are centered relative to the remanent portions of the sheets.

74. A magnetic actuator layer as in claim 73 wherein one sheet has a hump on which the roller pivots and the roller has a hump which contacts the other sheet thus allowing the roller to pivot on both sheets.

75. A magnetic actuator layer as in claim 43 wherein at least one of the sheets has a remanent portion having poles, the poles all aligned in the same direction, the rollers all carry current in the same direction and are centered relative to the remanent portions of the sheets.

76. A magnetic actuator layer as in claim 75 wherein one sheet has a hump on which the roller pivots and the roller has a hump which contacts the other sheet thus allowing the roller to pivot on both sheets.

77. A magnetic actuator layer as in claim 38 wherein both sheets have segmented remanent portions having poles, the poles are alternately aligned in opposite directions and centered relative to the rolling elements, the poles of one sheet's segments are aligned in the same direction as the poles in the correspondingly positioned opposing sheet, the rollers alternate the direction they carry current so that the force between all the rollers and the ribs are in the same direction.

78. A magnetic actuator layer as in claim 77 wherein one sheet has a hump on which the roller pivots and the roller has a hump which contacts the other sheet thus allowing the roller to pivot on both sheets.

79. A magnetic actuator layer as in claim 43 wherein both sheets have segmented remanent portions having poles, the poles are alternately aligned in opposite directions and centered relative to the rolling elements, the poles of one sheet's segments are aligned in the same direction as the poles in the correspondingly positioned opposing sheet, the rollers alternate the direction they carry current so that the force between all the rollers and the ribs are in the same direction.

80. A magnetic actuator layer as in claim 79 wherein one sheet has a hump on which the roller pivots and the roller has a hump which contacts the other sheet thus allowing the roller to pivot on both sheets.

81. A magnetic actuator layer as in claim 28 wherein the roller comprises two pair of rods having conductors, each pair has one rod disposed on top of the other, a current traveling in opposite directions in each pair of rods is transmitted through the conductors causing each pair to roll and move at least one sheet,
the ribs are remanent with triple poles, having like poles on the top and bottom, and all the ribs have the same pole alignments.

82. A magnetic actuator layer as in claim 81 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

83. A magnetic actuator layer as in claim 81 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that the sheets will be moved apart when the rods are displaced by magnetic forces when a current is transmitted through the conductors.

84. A magnetic actuator layer as in claim 33 wherein the roller comprises two pair of rods having conductors, each pair has one rod disposed on top of the other, a current traveling in opposite directions in each pair of rods is transmitted through the conductors causing each pair to roll and move the sheet,
the ribs are remanent with triple poles, having like poles on the top and bottom, and all the ribs have the same pole alignments.

85. A magnetic actuator layer as in claim 84 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

86. A magnetic actuator layer as in claim 84 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that the sheets will be moved apart when the rods are displaced by magnetic forces when a current traveling in opposite directions in each pair of rods is transmitted through the conductors.

87. A magnetic actuator layer as in claim 28 wherein there are ribs attached to both sheets, the ribs are remanent with poles facing each other being the same, and having a gap between the ribs, one rib being disposed above the other.

88. A magnetic actuator layer as in claim 87 wherein, the roller is comprised of two pair of rods having conductors, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

89. A magnetic actuator layer as in claim 87 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that and the sheets will be moved apart when the rods are displaced by magnetic forces when a current traveling in opposite directions in each pair of rods is transmitted through the conductors.

90. A magnetic actuator layer as in claim 33 wherein the roller comprises two pair of rods having conductors, each pair has one rod disposed on top of the other, a current traveling in opposite directions in each pair of rods is transmitted through the conductors causing each pair to roll and move the sheet, the ribs are remanent with triple poles, having like poles on the top and bottom, and all the ribs have the same pole alignments.

91. A magnetic actuator layer as in claim 90 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

92. A magnetic actuator layer as in claim 90 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that and the sheets will be moved apart when the rods are displaced by magnetic forces when a current traveling in opposite directions in each pair of rods is transmitted through the conductors.

93. A magnetic actuator layer as in claim 48 wherein the roller comprises two pair of rods having conductors, each pair has one rod disposed on top of the other, a current traveling in opposite directions in each pair of rods is transmitted through the conductors causing each pair to roll and move at least one sheet.

94. A magnetic actuator layer as in claim 93 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

95. A magnetic actuator layer as in claim 93 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that and the sheets will be moved apart when the rods are displaced by magnetic forces when a current is transmitted through the conductors.

96. A magnetic actuator layer as in claim 53 wherein the roller comprises two pair of rods having conductors, each pair has one rod disposed on top of the other, a current traveling in opposite directions in each pair of rods is transmitted through the conductors causing each pair to roll and move at least one sheet.

97. A magnetic actuator layer as in claim 96 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

98. A magnetic actuator layer as in claim 97 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that and the sheets will be moved apart when the rods are displaced by magnetic forces when a current is transmitter through the conductors.

99. A magnetic actuator layer as in claim 50 wherein the roller comprises a pair of remanent rods, one disposed on the other, with like poles being adjacent, the conductors in the sheets are centered relative to the rods, a current travels in opposite directions in each of the sheets, causing each pair to roll and move at least one sheet.

100. A magnetic actuator layer as in claim 99 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

101. A magnetic actuator layer as in claim 99 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that and the sheets will be moved apart when the rods are displaced by magnetic forces when a current is transmitter through the conductors.

102. A magnetic actuator layer as in claim 55 wherein the roller comprises a pair of remanent rods, one disposed on the other, with like poles being adjacent, the conductors in the sheets are centered relative to the rods, a current travels in opposite directions in each of the sheets, causing each pair to roll and move at least one sheet.

103. A magnetic actuator layer as in claim 102 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

104. A magnetic actuator layer as in claim 102 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that and the sheets will be moved apart when the rods are displaced by magnetic forces when a current is transmitted through the conductors.

105. A magnetic actuator layer as in claim 17 wherein the roller snakes between the ribs and the ribs have poles which alternately reverse so as to consistently apply a force in one direction due to the magnetic forces.

106. A magnetic actuator layer as in claim 105 wherein the roller has a circular cross section.

107. A magnetic actuator layer as in claim 22 wherein the roller snakes between the ribs and the ribs have poles which alternately reverse so as to consistently apply a force in one direction due to the magnetic forces.

108. A magnetic actuator layer as in claim 107 wherein the roller has a circular cross section.

109. A magnetic actuator layer as in claim 105 wherein the rib has a first side and an opposing side, a second roller snakes between the fixed ribs on the opposite side of the rib from the roller, thus giving the actuator the ability to translate the moveable sheet in two directions.

110. A magnetic actuator layer as in claim 109 wherein the rollers have a circular cross section.

111. A magnetic actuator layer as in claim 107 wherein the rib has a first side and an opposing side, a second roller snakes between the fixed ribs on the opposite side of the rib from the roller, thus giving the actuator the ability to translate the moveable sheet in two directions.

112. A magnetic actuator layer as in claim 111 wherein the rollers have a circular cross section.

113. A magnetic actuator layer as in claim 17 wherein the roller has an adjunct and the rib has a concave portion, both shaped to cooperate in reducing the reluctance between the roller and the rib.

114. A magnetic actuator layer as in claim 17 wherein the rib has a side facing the roller, the side is curved in a concave manner to reduce the reluctance between the roller and the rib.

115. A magnetic actuator as in claim 17 wherein the rib extends in the sheet under a portion of the roller to reduce the reluctance between the roller and the rib.

116. A magnetic actuator layer as in claim 22 wherein the roller has an adjunct and the rib has a concave portion, both shaped to cooperate in reducing the reluctance between the roller and the rib.

117. A magnetic actuator layer as in claim 22 wherein the rib has a side facing the roller, the side is curved in a concave manner to reduce the reluctance between the roller and the rib.

118. A magnetic actuator layer as in claim 22 wherein the rib extends in the sheet under a portion of the roller to reduce the reluctance between the roller and the rib.

119. A magnetic actuator layer as in claim 37 wherein the sheets are permeable and have permeable ribs wherein,
the first sheet having a first rib, a second rib and a third rib,
the second sheet having a first rib, a second rib and a third rib,
said first ribs disposed on opposing sides of one roller,
said second ribs disposed between said first and third ribs of the opposing sheet, the third ribs being the first ribs for the adjacent roller, such that the first and second ribs act as flux connecting poles around the rollers when a current is applied to the rollers, the current flowing in opposing directions in adjacent rollers.

120. A magnetic actuator layer as in claim 42 wherein the sheets are permeable and have permeable ribs wherein,
the first sheet having a first rib, a second rib and a third rib,
the second sheet having a first rib, a second rib and a third rib,
said first ribs disposed on opposing sides of one roller,
said second ribs disposed between said first and third ribs of the opposing sheet, the third ribs being the first ribs for the adjacent roller, such that the first and second ribs act as flux connecting poles around the rollers when a current is applied to the rollers, the current flowing in opposing directions in adjacent rollers.

121. A magnetic actuator layer as in claim 119 wherein sheets have symmetric ribs on each surface of the sheets so that rollers can be used on both sides of the sheets, the rollers being stacked one over the other and having currents in opposing directions.

122. A magnetic actuator layer as in claim 120 wherein sheets have symmetric ribs on each surface of the sheets so that rollers can be used on both sides of the sheets, the rollers being stacked one over the other and having currents in opposing directions.

123. A magnetic actuator layer as in claim 27 wherein the roller comprises two pair of rods having conductors, each pair has one rod disposed on top of the other, a current traveling in opposite directions in each pair of rods is transmitted through the conductors causing each pair to roll and move at least one sheet.

124. A magnetic actuator layer as in claim 123 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

125. A magnetic actuator layer as in claim 123 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that and the sheets will be moved apart when the rods are displaced by magnetic forces when a current is transmitted through the conductors.

126. A magnetic actuator layer as in claim 27 wherein the roller comprises two pair of rods having conductors, each pair has one rod disposed on top of the other, a current traveling in opposite directions in each rod of each pair of rods is transmitted through the conductors, adjacent rods in each pair having opposite currents, causing each pair to roll and move at least one sheet.

127. A magnetic actuator layer as in claim 126 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

128. A magnetic actuator layer as in claim 126 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that and the sheets will be moved apart when the rods are displaced by magnetic forces when a current is transmitted through the conductors.

129. A magnetic actuator layer as in claim 32 wherein the roller comprises two pair of rods having conductors, each pair has one rod disposed on top of the other, a current traveling in opposite directions in each pair of rods is transmitted through the conductors causing each pair to roll and move at least one sheet.

130. A magnetic actuator layer as in claim 129 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

131. A magnetic actuator layer as in claim 129 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that and the sheets will be moved apart when the rods are displaced by magnetic forces when a current is transmitted through the conductors.

132. A magnetic actuator layer as in claim 32 wherein the roller comprises two pair of rods having conductors, each pair has one rod disposed on top of the other, a current traveling in opposite directions in each rod of each pair of rods is transmitted through the conductors, adjacent rods in each pair having opposite currents, causing each pair to roll and move at least one sheet.

133. A magnetic actuator layer as in claim 132 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

134. A magnetic actuator layer as in claim 132 wherein each rod has a first surface and a second surface, the rods having convex cylindroidal curvatures on their first surface and flat second surfaces, one sheet having humps on which flat surfaces pivot, a first surface from one rod contacting the second surface of the other rod, the cylindroidal curvature is greater than that of a cylinder that fits in the same space so that and the sheets will be moved apart when the rods are displaced by magnetic forces when a current is transmitted through the conductors.

135. A magnetic actuator layer as in claim 27 wherein the roller comprises two pair of rods having conductors, each pair has one rod disposed on top of the other and each rod having an integral permeable adjunct containing a conductor on the surface of the rod contacting the other rod.

136. A magnetic actuator layer as in claim 32 wherein the roller comprises two pair of rods having conductors, each pair has one rod disposed on top of the other and each rod having an integral permeable adjunct containing a conductor on the surface of the rod contacting the other rod.

137. A magnetic actuator layer as in claim 27 wherein the roller comprises two pair of rods having conductors, each pair has one rod disposed on top of the other, wherein the rib has an excrescence between the rods to reduce magnetic reluctance.

138. A magnetic actuator layer as in claim 32 wherein the roller comprises two pair of rods having conductors, each pair has one rod disposed on top of the other, wherein the rib has an excrescence between the rods to reduce magnetic reluctance.

139. A magnetic actuator layer as in claim 27 wherein the roller comprises two pair of rods having conductors, each pair has one rod disposed on top of the other, wherein there are ribs attached to both sheets, the ribs are disposed on the sheets so that one rib is above the other with a gap between them.

140. A magnetic actuator layer as in claim 32 wherein the roller comprises two pair of rods having conductors, each pair has one rod disposed on top of the other, wherein there are ribs attached to both sheets, the ribs are disposed on the sheets so that one rib is above the other with a gap between them.

141. A magnetic actuator layer as in claim 19 wherein the ribs have conductors which alternately have current running in opposite directions and the rollers have current which alternately runs in opposing directions so that a force between the rollers and the ribs is consistently applied in one direction.

142. A magnetic actuator layer as in claim 141 wherein the sheets are stacked so that ribs with currents in the same direction are disposed one above the other.

143. A magnetic actuator layer as in claim 24 wherein the ribs have conductors which alternately have current running in opposite directions and the rollers have current which alternately runs in opposing directions so that a force between the rollers and the ribs is consistently applied in one direction.

144. A magnetic actuator layer as in claim 143 wherein the sheets are stacked so that ribs with currents in the same direction are disposed one above the other.

145. A magnetic actuator layer as in claim 9 wherein there is a means for inducing a voltage from the ribs to the rollers and then measuring the voltage induced to indicated the relative position of the ribs and rollers.

146. A magnetic actuator layer as in claim 10 wherein there is a means for inducing a voltage from the ribs to the rollers and then measuring the voltage induced to indicated the relative position of the ribs and rollers.

147. A magnetic actuator layer as in claim 11 wherein there is a means for inducing a voltage in at least one roller and measuring the voltage induced to indicated the roller position.

148. A magnetic actuator layer as in claim 12 wherein there is a means for inducing a voltage in at least one roller and measuring the voltage induced to indicated the roller position.

149. A magnetic actuator layer as in claim 13 wherein there is a means for inducing a voltage in at least one roller and measuring the voltage induced to indicated the roller position.

150. A magnetic actuator layer as in claim 14 wherein there is a means for inducing a voltage in at least one roller and measuring the voltage induced to indicated the roller position.

151. A magnetic actuator layer as in claim 15 wherein there is a means for inducing a voltage in at least one roller and measuring the voltage induced to indicated the roller position.

152. A magnetic actuator layer as in claim 16 wherein there is a means for inducing a voltage in at least one roller and measuring the voltage induced to indicated the roller position.

153. A magnetic actuator layer as in claim 9 wherein there is a means for inducing a voltage in at least one roller and measuring the capacitance of the roller to indicate the roller position.

154. A magnetic actuator layer as in claim 10 wherein there is a means for inducing a voltage in at least one roller and measuring the capacitance of the roller to indicate the roller position.

155. A magnetic actuator layer as in claim 11 wherein there is a means for inducing a voltage in at least one roller and measuring the capacitance of the roller to indicate the roller position.

156. A magnetic actuator layer as in claim 12 wherein there is a means for inducing a voltage in at least one roller and measuring the capacitance of the roller to indicate the roller position.

157. A magnetic actuator layer as in claim 13 wherein there is a means for inducing a voltage in at least one roller and measuring the capacitance of the roller to indicate the roller position.

158. A magnetic actuator layer as in claim 14 wherein there is a means for inducing a voltage in at least one roller and measuring the capacitance of the roller to indicate the roller position.

159. A magnetic actuator layer as in claim 15 wherein there is a means for inducing a voltage in at least one roller and measuring the capacitance of the roller to indicate the roller position.

160. A magnetic actuator layer as in claim 16 wherein there is a means for inducing a voltage in at least one roller and measuring the capacitance of the roller to indicate the roller position.

161. A magnetic actuator layer as in claim 1 wherein, the sheets are flat, said roller comprises a pair of rods having conductors, the pair of rods has one rod disposed on top of the other, a current transmitted through the conductors causes the rods to roll and move at least one sheet.

162. A magnetic actuator layer as in claim 1 wherein, the sheets are curved, said roller comprises a pair of rods having conductors, the pair of rods has one rod disposed on top of the other, a current transmitted through the conductors causes the rods to roll and move at least one sheet.

163. A magnetic actuator layer as in claim 161 wherein the roller comprises two pair of rods having conductors, each pair has one rod disposed on top of the other, a current traveling in opposite directions in each pair of rods is transmitted through the conductors causing each pair to roll and move at least one sheet.

164. A magnetic actuator layer as in claim 161 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

165. A magnetic actuator layer as in claim 162 wherein the roller comprises two pair of rods having conductors, each pair has one rod disposed on top of the other, a current traveling in opposite directions in each pair of rods is transmitted through the conductors causing each pair to roll and move at least one sheet.

166. A magnetic actuator layer as in claim 162 wherein, each rod has a top surface and a bottom surface, the rods having convex cylindroidal curvatures on their top and bottom surfaces, such that the cylindroidal curvature is greater than that of a cylinder that fits in the same space so that the sheets will be moved apart when the rods are displaced by magnetic forces when a current is transmitted through the conductors.

167. A magnetic actuator layer as in claim 161 wherein there is a means for inducing a voltage in at least one roller and measuring the voltage induced to indicated the roller position.

168. A magnetic actuator layer as in claim 162 wherein there is a means for inducing a voltage in at least one roller and measuring the voltage induced to indicated the roller position.

169. A magnetic actuator layer as in claim 161 wherein there is a means for inducing a voltage in at least one roller and measuring the capacitance of the roller to indicate the roller position.

170. A magnetic actuator layer as in claim 162 wherein there is a means for inducing a voltage in at least one roller and measuring the capacitance of the roller to indicate the roller position.

171. A magnetic actuator layer as in claim 161 wherein each rod has a top surface and a bottom surface, the rods having an asymmetric shape such that rotation in one direction displaces the sheets upward and rotation in the opposing direction disposes the sheets downward.

172. A magnetic actuator as in claim 1 wherein the magnetic actuator layers are stacked to form actuators.

173. A magnetic actuator as in claim 172 wherein at least one sheet has two sides and has a roller on both sides so that the actuator layers are stacked having a common sheet between them.

174. A magnetic actuator as in claim 173 wherein one layer has a sheet attached to a base and another layer has a sheet having a traction surface portion for engaging objects.

175. A magnetic actuator as in claim 172 wherein at least one layer is a tangenter and at least one layer is a lifter.

176. A magnetic actuator as in claim 172 wherein at least one layer is a tangenter, at least one layer is a lifter and at least one layer is an axier.

177. A magnetic actuator as in claim 172 wherein at least one layer has curved sheets for curved actuator motion.

178. A magnetic actuator as in claim 172 wherein layers of other types of actuators are used.

179. A magnetic actuator as in claim 172 wherein the layers of other types of actuators used are made up of electrodeformable materials.

180. A magnetic actuator as in claim 172 wherein the electrodeformable material is a piezoelectric material.

181. A magnetic actuator as in claim 172 wherein there is a means to control the position of each layer individually.

182. A magnetic actuator as in claim 181 wherein each layer has a means of sensing its position.

183. A magnetic actuator as in claim 181 wherein a controller uses mechanical fourier summing of the layers to move the actuator.

184. A magnetic actuator as in claim 181 wherein two or more actuators are controlled simultaneously such that the actuators engage and position an object.

185. A magnetic actuator as in claim 184 wherein smooth walking motion is employed to position the object.

186. A magnetic actuator layer as in claim 15 wherein a compliant material is used in the space adjacent to the rollers for stability and retention of the rollers.

187. A magnetic actuator layer as in claim 16 wherein a compliant material is used in the space adjacent to the rollers for stability and retention of the rollers.

188. A magnetic actuator as in claim 173 wherein one layer has a sheet attached to a base and another layer has a sheet having a curved surface portion for exposure to fluids around a shaft, the layers actuated normally to adjust the spacing of the curved surface portion relative to the shaft.

189. A magnetic actuator as in claim 174 wherein the sheets are curved.

190. A magnetic actuator layer as in claim 1 wherein there is a springy filament on the roller that stores energy when the filament is compressed.

191. A magnetic actuator layer as in claim 3 wherein the roller comprises two rods one disposed on top of the other, the rods having top and bottom surfaces with a springy filament so that energy is stored in the springy filament when the rods roll.

192. A magnetic actuator layer as in claim 81 wherein there is a springy filament on the rods so that energy is stored in the springy filament when the rods roll.

193. A magnetic actuator layer as in claim 82 wherein there is a springy filament on the rods so that energy is stored in the springy filament when the rods roll.

194. A magnetic actuator layer as in claim 88 wherein there is a springy filament on the rods so that energy is stored in the springy filament when the rods roll.

195. A magnetic actuator layer as in claim 89 wherein there is a springy filament on the rods so that energy is stored in the springy filament when the rods roll.

196. A magnetic actuator layer as in claim 90 wherein there is a springy filament on the rods so that energy is stored in the springy filament when the rods roll.

197. A magnetic actuator layer as in claim 91 wherein there is a springy filament on the rods so that energy is stored in the springy filament when the rods roll.

198. A magnetic actuator layer as in claim 93 wherein there is a springy filament on the rods so that energy is stored in the springy filament when the rods roll.

199. A magnetic actuator layer as in claim 94 wherein there is a springy filament on the rods so that energy is stored in the springy filament when the rods roll.

200. A magnetic actuator layer as in claim 96 wherein there is a springy filament on the rods so that energy is stored in the springy filament when the rods roll.

201. A magnetic actuator layer as in claim 97 wherein there is a springy filament on the rods so that energy is stored in the springy filament when the rods roll.

202. A magnetic actuator layer as in claim 98 wherein there is a springy filament on the rods so that energy is stored in the springy filament when the rods roll.

203. A magnetic actuator layer as in claim 99 wherein there is a springy filament on the rods so that energy is stored in the springy filament when the rods roll.

204. A magnetic actuator layer as in claim 102 wherein there is a springy filament on the rods so that energy is stored in the springy filament when the rods roll.

205. A magnetic actuator layer as in claim 103 wherein there is a springy filament on the rods so that energy is stored in the springy filament when the rods roll.

206. A magnetic actuator layer as in claim 123 wherein there is a springy filament on the rods so that energy is stored in the springy filament when the rods roll.

207. A magnetic actuator layer as in claim 124 wherein there is a springy filament on the rods so that energy is stored in the springy filament when the rods roll.

208. A magnetic actuator layer as in claim 129 wherein there is a springy filament on the rods so that energy is stored in the springy filament when the rods roll.

209. A magnetic actuator layer as in claim 130 wherein there is a springy filament on the rods so that energy is stored in the springy filament when the rods roll.

210. A magnetic actuator layer as in claim 132 wherein there is a springy filament on the rods so that energy is stored in the springy filament when the rods roll.

211. A magnetic actuator layer as in claim 133 wherein there is a springy filament on the rods so that energy is stored in the springy filament when the rods roll.

212. A magnetic actuator layer as in claim 161 wherein there is a springy filament on the rods so that energy is stored in the springy filament when the rods roll.

213. A magnetic actuator layer as in claim 162 wherein there is a springy filament on the rods so that energy is stored in the springy filament when the rods roll.

214. A magnetic actuator layer as in claim 163 wherein there is a springy filament on the rods so that energy is stored in the springy filament when the rods roll.

215. A magnetic actuator layer as in claim 165 wherein there is a springy filament on the rods so that energy is stored in the springy filament when the rods roll.

216. A magnetic actuator layer as in claim 1 wherein a compliant material is used in the space adjacent to the rollers for stability and retention of the rollers.

217. A magnetic actuator layer as in claim 9 wherein a compliant material is used in the space adjacent to the rollers for stability and retention of the rollers.

218. A magnetic actuator layer as in claim 10 wherein a compliant material is used in the space adjacent to the rollers for stability and retention of the rollers.

219. A magnetic actuator layer as in claim 11 wherein a compliant material is used in the space adjacent to the rollers for stability and retention of the rollers.

220. A magnetic actuator layer as in claim 12 wherein a compliant material is used in the space adjacent to the rollers for stability and retention of the rollers.

221. A magnetic actuator layer as in claim 13 wherein a compliant material is used in the space adjacent to the rollers for stability and retention of the rollers.

222. A magnetic actuator layer as in claim 14 wherein a compliant material is used in the space adjacent to the rollers for stability and retention of the rollers.

* * * * *